US012790024B2

(12) United States Patent
Pica

(10) Patent No.: US 12,790,024 B2
(45) **Date of Patent: *Nov. 10, 2026**

(54) PASSENGER BOARDING BRIDGE INCORPORATING AIR BARRIERS

(71) Applicant: Bret D. Pica, Denver, CO (US)

(72) Inventor: Bret D. Pica, Denver, CO (US)

( * ) Notice: Subject to any disclaimer, the term of this patent is extended or adjusted under 35 U.S.C. 154(b) by 622 days.

This patent is subject to a terminal disclaimer.

(21) Appl. No.: 18/340,655

(22) Filed: Jun. 23, 2023

(65) Prior Publication Data

US 2023/0415919 A1 Dec. 28, 2023

Related U.S. Application Data

(63) Continuation-in-part of application No. 17/847,177, filed on Jun. 23, 2022, now Pat. No. 12,460,728.

(60) Provisional application No. 63/439,821, filed on Jan. 18, 2023, provisional application No. 63/408,128, filed on Sep. 20, 2022, provisional application No. 63/396,606, filed on Aug. 10, 2022, provisional application No. 63/395,816, filed on Aug. 6, 2022, provisional application No. 63/394,606, filed on Aug. 3, 2022, provisional application No. 63/394,593, filed on Aug. 2, 2022.

(51) Int. Cl.
*B64F 1/30* (2006.01)
*B64F 1/305* (2006.01)

(52) U.S. Cl.
CPC .................................... *B64F 1/305* (2013.01)

(58) Field of Classification Search
CPC ........................................................ B64F 1/305
USPC .................................................. 14/71.1–71.5
See application file for complete search history.

(56) References Cited

U.S. PATENT DOCUMENTS

| | | |
|---|---|---|
| 2,648,554 A | 8/1953 | Gilbert, Sr. |
| 2,822,192 A | 2/1958 | Beatty |
| 3,110,048 A | 11/1963 | Bolton |

(Continued)

FOREIGN PATENT DOCUMENTS

| | | |
|---|---|---|
| CA | 660225 A | 3/1963 |
| DE | 916250 C | 8/1954 |

(Continued)

OTHER PUBLICATIONS

International Search Report and Written Opinion received for International Patent Application No. PCT/US2023/069014, mailed on Oct. 10, 2023, 09 pages.

(Continued)

*Primary Examiner* — Raymond W Addie

(74) *Attorney, Agent, or Firm* — Adams & Reese LLP

(57) ABSTRACT

An improved passenger boarding bridge comprises a proximal section such as a rotunda which is connectable to a doored exit of an airport concourse, a distal section such as a cab adapted to dock with a parked aircraft, and at least one tunnel section interposed therebetween. A plurality seals are associated with the various sections and their junctures to extend an environmental envelope of the airport concourse to the parked aircraft. For example, a first plurality of seals may be provided for sealing a juncture of the rotunda section and the tunnel section, and a second plurality of seals may be provided for sealing a juncture of the cab section and the tunnel section. Seals are also associated with each of the rotunda and cab sections.

22 Claims, 26 Drawing Sheets

(56) References Cited

U.S. PATENT DOCUMENTS

| | | | | | |
|---|---|---|---|---|---|
| 3,184,772 | A | | 5/1965 | Carvel et al. | |
| 3,263,254 | A | | 8/1966 | Wollard et al. | |
| 3,412,412 | A | | 11/1968 | Kjerulf et al. | |
| 3,951,684 | A | | 4/1976 | Laprad et al. | |
| 4,120,067 | A | | 10/1978 | Hone et al. | |
| 4,180,272 | A | | 12/1979 | Heitz | |
| 4,319,376 | A | | 3/1982 | Saunders | |
| 4,333,194 | A | | 6/1982 | Drozd | |
| 4,750,299 | A | * | 6/1988 | Frommelt ............ | B65G 69/008 52/2.13 |
| 5,084,936 | A | | 2/1992 | Thomas, Jr. | |
| 5,893,567 | A | | 4/1999 | Bitterli | |
| 6,055,692 | A | | 5/2000 | Pell et al. | |
| 6,487,742 | B1 | | 12/2002 | Beazer et al. | |
| 7,269,871 | B2 | | 9/2007 | Koch et al. | |
| 11,649,121 | B2 | * | 5/2023 | Thole ................... | B65G 69/008 14/71.3 |
| 2003/0145399 | A1 | | 8/2003 | Smith et al. | |
| 2012/0279417 | A1 | * | 11/2012 | Charbonneau ............ | B60P 1/43 14/71.1 |

FOREIGN PATENT DOCUMENTS

| | | | |
|---|---|---|---|
| DE | 3930871 | A1 | 3/1990 |
| EP | 0205314 | A1 | 12/1986 |

OTHER PUBLICATIONS

Extended European Search Report in related European Application No. 23828094.5, mailed May 6, 2026; 11 Pages.

* cited by examiner

1300

3200

PASSENGER BOARDING BRIDGE INCORPORATING AIR BARRIERS

CROSS-REFERENCE TO RELATED APPLICATION(S)

This application is a continuation-in-part of U.S. application Ser. No. 17/847,177, filed Jun. 23, 2022, now pending. This application claims priority to and the benefit of U.S. Provisional Application No. 63/394,593, filed Aug. 2, 2023, U.S. Provisional Application No. 63/394,606, filed Aug. 3, 2022, U.S. Provisional Application No. 63/395,816, filed Aug. 6, 2022, U.S. Provisional Application No. 63/396,606, filed Aug. 10, 2022, U.S. Provisional Application No. 63/408,128, filed Sep. 20, 2022, and of U.S. Provisional Application No. 63/439,821, filed Jan. 18, 2023.

FIELD OF THE INVENTION

The disclosed relates to the field of aircraft passenger boarding bridges, specifically to sealing of passenger boarding bridges, and more specifically seals for creating a more airtight and fire resistive passenger boarding bridge.

BACKGROUND

Passenger boarding bridges are well known and are used at airports to load and unload passengers between concourses and parked aircraft. Passenger boarding bridges are typically connected to an airport terminal building or concourse at agate which is comprised of an exterior door in a terminal building envelope. There may be a plurality of passenger boarding bridge gates in a terminal building or concourse and there may be a plurality of concourses at an airport. Henceforth, concourse and terminal building will be used interchangeably.

Usage of concourse gate doors opening to the passenger boarding bridges differs substantially from average buildings where a person passing through a door may open the door for seconds at a time. Concourse gate doors may be held open continuously for substantial fractions of an hour. Each gate door opening to a passenger boarding bridge may be open for a substantial portion of a day as multiple aircraft arrive and depart and passengers board and deplane aircraft. Airlines often schedule flights with overlapping arrival and departure times across the gates to optimize operations and aircraft usage. This results in multiple gate doors being open coincidentally.

Passenger boarding bridges have empirically been considered exterior to concourse building envelopes and are constructed to be weather tight. Prior-art specifications disclosed in Patent Nos. CA 660,225, U.S. Pat. Nos. 3,412,412, 4,333,194, 6,487,742, and 7,269,871 allude to weather tight construction. As such the envelope separating the interior of passenger boarding bridges from the exterior atmosphere has generally not been sealed to building envelope construction standards. The objective of weather tight construction is to protect passengers from physical inclement weather conditions including sun, rain, snow, hail, and wind. However, wind and breezes often induce infiltration and exfiltration to passenger boarding bridges, Snow may within state-of-the-art passenger boarding bridges because of wind effects in inclement weather.

The construction forming the shell or envelope of a typical passenger boarding bridge is complex. A passenger boarding bridge has a multiplicity of degrees of freedom and given the occupiable nature of the passenger boarding bridge much of the envelope construction is integral to passenger boarding bridge articulation. The passenger boarding bridge may be comprised of fixed structures, telescoping passageway tunnels, rotatable structures, leveling apparatus, and elevational apparatus. As such many different types of seals may be required to provide air barriers between sections of passenger boarding bridge structure to create a substantially airtight barrier between the passenger boarding bridge interior and exterior atmosphere Poorly sealed passenger boarding bridges may allow the introduction of substantial amounts of unconditioned air into concourses when concourse gate doors are open. For instance, the air pressures encountered by an open gate door on one side of a concourse may induce uncontrolled airflow into a concourse from an open gate door on the other side thereby inducing crossflow through the concourse. The effect is compounded when multiple gate doors are open. Each boarding bridge is a part of and contributes to system of air movement in a concourse. These uncontrolled air flows may create significant heating and cooling demands on airport and concourse environmental systems depending on the temperature and humidity differences between the concourse interior and external ambient conditions. Given that many airports have tens if not hundreds of boarding bridges there are substantial implications for energy consumption, energy cost, passenger comfort, and carbon footprint which could be mitigated by adding air barriers to the passenger boarding bridges to make the passenger boarding bridges substantially airtight.

Building envelope infiltration and exfiltration is measured as a function of airflow and pressure. For instance, the 2021 International Energy Code, requires that air losses not exceed test conditions of 0.4 cubic feet per minute per square foot of envelope area at a pressure differential of 0.3 inches of water column when subjected to a blower door test. Building infiltration and exfiltration is the subject of significant literature describing wind effects, crack losses, openings, and etc. in publications by multiple organizations such as the American Society of Heating and Refrigeration Engineers (ASHRAE).

The following orifice equation to estimate air movement through openings given a pressure differential including unit conversions is derived from the orifice equation provided in the 2019 ASHRAE Applications Handbook Chapter 54 at standard atmospheric conditions at sea level:

$$Q=3966\sqrt{\Delta p}$$

where

Q=volumetric airflow in cubic feet per minute

C=dimensionless flow coefficient

A=the area of the opening in square feet

Δp=the pressure difference, inches of water column

Passenger boarding bridge passageways are generally comprised of a rotational passageway called a rotunda, two interstitial and overlapping telescoping tunnels, and a second rotatable passageway near the aircraft called a cab. A table of the junctures of the sections is provided below with the approximate height and width of the overlapping sections with Juncture 1 being the juncture between the rotunda and the first telescoping section, Juncture 2 between the first and second telescoping section, and Juncture 3 between the second telescoping section and the final overlapping section which extends from the cab. Airflows are calculated from the above equation using an average of 2" for the gap between the sides of the overlapping sections, 1" for the gap across the top of the internal section, and C=0.5 for the flow coefficient. Published values of flow coefficient C are determined experimentally and C=0.5 was estimated based on ranges of similar applications described in the ASHRAE Applications Handbook. The gaps between the floors were not included.

| | Height (inches) | Width(inches) | Gap length (feet) | Opening Area (sq. ft) | Airflow (cubic feet per minute) |
|---|---|---|---|---|---|
| Juncture 1 | 90 | 57 | 20 | 2.9 | 1,285 |
| Juncture 2 | 85 | 72 | 20 | 2.9 | 1,270 |
| Juncture 3 | 110 | 85 | 25 | 3.6 | 1,615 |
| Total | | | 65 | 9.4 | 4,200 |

The total airflow at 0.05 inches of water column for these junctures is estimated to be 4,200 cubic feet per minute.

Between the roofs and arcuate curtains of the rotunda and cab there is a gap of approximately 12". The arcuate curtains are circular with approximately 60% of the circumference interrupted by connected passageways.

| | Diameter (inches) | Opening Height(inches) | Circumference reduction (%) | Opening length (ft) | Opening Area (square feet) | Airflow (cubic feet per minute) |
|---|---|---|---|---|---|---|
| Rotunda | 96 | 12 | 60 | 15 | 15 | 6,700 |
| Cab | 94 | 12 | 60 | 15 | 15 | 6,700 |
| Total | | | | 30 | 30 | 13,400 |

The total airflow at 0.05 inches of water column is estimated to be 13,400 cubic feet per minute.

The estimated gap between a large body aircraft and an awning is between 4 square feet for newer passenger boarding bridges and 6 square feet for older passenger boarding bridges with a calculated airflow of 2,200 cubic feet per minute.

The estimated envelope surface area for a 100 foot long passenger boarding bridge with the tabulated dimensions is 3,400 square feet. This yields 1,360 cubic feet per minute of air leakage at 0.3 inches of water column which is equivalent to 750 cubic feet per minute at 0.05 inches of water column after applying affinity laws.

The total airflow for all opening losses is then 20,550 cubic feet per minute in calm air if a pressure differential of 0.05 inches of water column was maintained over the length of the passenger boarding bridge. However, pressure decreases as air is lost through gaps as it moves down the passenger boarding bridge so actual airflow losses can be below 7,000 cubic feet per minute in calm wind conditions. The calculated airflow leakage rates calculations are also highly dependent on the value of flow coefficient C which may be lower for this application.

For small gaps of less than ½ inch leakage rates per lineal foot vs. pressure are provided in Heating, Ventilating, and Air Conditioning 5th edition, McQuiston and are tabulated as follows for a differential pressure of 0.05 inches water column.

| Gap (inches) | Cubic Feet per Minute per Foot | Total Airflow (CFM) | Probability (%) | Gap Length (feet) | Probabilistic Airflow (CFM) |
|---|---|---|---|---|---|
| 0 | 0 | 0 | 20 | 27 | 0 |
| 1/16 | 3.5 | 473 | 30 | 40.5 | 140 |
| 1/8 | 9 | 1,215 | 20 | 27 | 245 |
| 1/4 | 18 | 2,430 | 15 | 20.25 | 365 |
| 1/2 | 34 | 4,590 | 15 | 20.25 | 690 |
| Total | | | 100 | 135 | 1,450 |

The present disclosures are intended to reduce the total exfiltration airflow rate of a passenger boarding bridge to 2,500 cubic feet per minute or less to be within a reasonable level of terminal building air handling system performance. Given the dynamic nature of the passenger boarding bridge environment and the seals probabilistic estimates and sums are provided for the length of each gap with a total estimated exfiltration of 1,450 cubic feet per minute which is 60% of the target value and 13% of the estimated state of the art air leakage rates. These probabilities are likely conservative considering that the disclosed seals are intended to be zero gap.

Passenger boarding bridges also serve as an emergency egress passageway in the event of an emergency such as a ramp fuel fire. National Fire Protection Association (NFPA) Standard 415 prescribes the fire resistive performance requirements of passenger boarding bridge components in a temperature vs. time profile. However, NFPA 415 does not require passenger boarding bridges to be tested as a complete assembly. State of the art passenger boarding bridge construction would likely not be acceptable to current building or NFPA codes given the substantial gaps with consequent infiltration and exfiltration at the many different joints in a passenger boarding bridge.

PRIOR ART DESCRIPTION

FIG. 1 and FIG. 1A illustrate a prior art articulating passenger boarding bridge 100 substantially described in U.S. Pat. No. 3,412,412. A rotunda 102 is typically connected to an airport building or fixed passageway 104. The rotunda 102 is comprised of structures mounted on a fixed base 106 and bearing 108 and allows pivotable movement about rotational axis 110 thereby allowing rotation of a first telescoping enclosed passageway, or tunnel, 112 about rotational axis 110. A second telescoping tunnel 114 is larger in cross section than first telescoping tunnel 112 and slides in a telescoping manner over the first telescoping tunnel 112. This forms an overlapping and concentric juncture region which extends from the overlapped end of the first telescoping tunnel 112 to the end of the overlapping second telescoping tunnel 114. An end telescoping tunnel 118 overlaps tunnel 114 with a juncture region between the overlapping ends of tunnel 114 and tunnel 118 and terminates with a rotatable cab 120 which rotates about rotational axis 122 to face a parked aircraft 124. When the cab 120 is moved into position at aircraft 124 a bellowed awning 126 is extended to contact the aircraft 124 exterior fuselage 128 with awning pad 130.

The concourse side of the passenger boarding bridge may be considered the inboard side and towards the aircraft as the outboard side.

Side panels 132 are located on either side of awning 126. Fixed pads 133 may be located at the outboard side of guides 132. Elevational means to raise and lower cab 120 is provided by vertical movement means at truck 134 about horizontal transverse pivot 136 which allows displacement of cab 120 in a vertical plane. Utility swing arms 138 extend from a pivot 140 at the bottom of telescoping tunnels 112, 114 to a peak pivot 142.

When the passenger boarding bridge is desired to be docked with aircraft 124 cab 120 is displaced vertically to match the cab floor 144 height with the parked aircraft 124 floor 146 height. Telescoping tunnel 112, 114, 118 rotate about lateral pivot 136 at a juncture region between telescoping tunnel 112 and outboard rotunda wall 150. Arcuate curtains 152 at rotunda 102 and cab 120 shaped by guiding means (not shown) at rotunda roof 154 and rotunda floor 156 and cab roof 158 and cab floor 144 provide a weather barrier between the atmosphere and the passenger boarding bridge interior when rotunda 102 pivots about vertical rotational axis 110. A passenger boarding bridge may have a plurality of successive first and second telescoping tunnels 112, 114. Three concentric tunnels 112, 114, 118 are shown and should not interpreted as limiting the application of the present disclosure. Some passenger boarding bridges may also reverse the order of the telescoping tunnel sections with a larger cross-sectional tunnel 112 connected to rotunda 112 and reducing in cross sectional size toward the aircraft 124.

In FIG. 1B an aircraft cabin door 160 is shown with awning pad 130 outline as a dashed line when docked from the point of view in cab 120 looking at aircraft 124.

Now turning to FIG. 1C in rotunda 102 arcuate curtains 152 wind and unwind from reels 162 and are tensioned by idlers 164 located in housings 166.

Similarly in FIG. 1D at the cab 120 arcuate curtains 152 wind and unwind from reels 162 and are tensioned by idlers 164 located in housings 166 and allow pivotal movement of the cab 120 about rotational axis 122 to face the aircraft 124 fuselage door 160. Cab walls 168 are identified.

The passenger boarding bridge 100 as described is well known in prior art and in practice and provides robust means to dock with myriad makes and models of parked aircraft and are substantially described in U.S. Pat. No. 4,333,194. Several components like the rotatable cab 120, awning 126, and truck 134 are example structures and are not fully inclusive of design possibilities.

SUMMARY

According to some embodiments a passenger boarding bridge is provided for extending an environmental envelope of an airport concourse to a parked aircraft. The passenger boarding bridge may comprise a proximal section connectable to a doored exit of the airport concourse, a distal section adapted to dock with the parked aircraft, and at least one tunnel section interposed between the proximal section and the distal section. A plurality of distal section seals may be associated with the distal section to contact the parked aircraft when the distal section is docked therewith. A first plurality of seals may be provided for sealing a juncture of the proximal section and the tunnel section, and a second plurality of seals may be provided for sealing a juncture of the distal section and the tunnel section. One or more of these seals may comprise at least one inflatable seal assembly.

The proximal section may comprise a proximal section air barrier including at least a first proximal section air barrier member fixed in position when the proximal section is connected to the door exit, and a second proximal section air barrier member that is rotatable relative to the first proximal section air barrier member about a vertical axis of the proximal section. The distal section may comprise an associated distal section air barrier including at least a first distal section member that is fixed in position when the distal section is docked with the aircraft, and a second distal section air barrier rotatable relative to the first distal section air barrier member about a distal section rotational axis.

According to some embodiments, the proximal section is a rotunda section, the distal section is a cab section, and at least one tunnel section is located therebetween. A horizontal rotunda air barrier is situated below a rotunda roof and includes at least a first horizontal rotunda member adapted to be fixed in position when the rotunda section is connected to the doored exit, and a second horizontal rotunda member rotatable relative to the first horizontal rotunda member about a rotunda section vertical rotational axis. According to some embodiments, the horizontal rotunda air barrier is interposed between a roof of the rotunda and an architectural ceiling of the rotunda, with an insulation layer disposed in the interstitial space therebetween, while in other embodiments the horizontal rotunda air barrier serves as the architectural ceiling of the rotunda section and includes an insulation layer. A vertical rotunda air barrier may also be fastened to the horizontal rotunda air barrier.

The first and second horizontal rotunda members may be sealed in a variety of ways such as through calipers, in abutment with one another, or overlapping with one another, to name a few. Where calipers are employed, a groove may be provided for enhancing a barrier seal between the two members.

The first horizontal rotunda member may extend from an end wall of the doored exit toward the at least one tunnel section, and the second horizontal rotunda member may extend from proximate to the at least one tunnel section toward the end wall. Here, the first horizontal member may be bounded by an end wall of the doored exit, fixed rotunda walls, movable arcuate curtains and a radial arc that is defined at an intersection of the fixed tunnel with the rotunda roof. The second horizontal rotunda member may be rotatable about the rotunda vertical axis and bounded by a rotunda exterior wall, rotational rotunda walls and the radial arc. In an alternate embodiment, the first horizontal rotunda member may extend from proximate to the tunnel section toward the end wall of the doored exit, while the second horizontal rotunda member extends from the end wall toward the tunnel section.

The cab section for the passenger boarding bridge may comprise a horizontal cab air barrier including at least a first horizontal cab member fixed in position when the cab section is docked with the parked aircraft, and a second horizontal cab member rotatable relative to the first horizontal cab member about a cab section rotational axis. The cab may include an awning pad with at least one awning expandable bladder attached thereto, and a cab floor having an underside with an associated cab floor seal, such as an inflatable seal or a deformable bumper, adapted to contact a fuselage of the parked aircraft. Where an inflatable seal is employed, it may be movable between a contracted position having a deflated state wherein the cab floor seal is disengaged from the fuselage, and a deployed position having an inflated state wherein the cab floor seal contacts the fuselage.

In some embodiments, a first surrounding and expandible airtight seal may be disposed at a first juncture region between the rotunda section and the at least one tunnel section, and a second surrounding and expandible airtight seal may be disposed at a second juncture region between the at least one tunnel section and cab section.

In some embodiments, the at least one tunnel section includes a plurality of telescoping tunnels with at least one inflatable seal assembly located at each juncture of the telescoping tunnels. Thermocouples and dry sprinkler piping may be attached to an exterior wall of an inner one of the telescoping tunnels and deluge discharge nozzles may be connected to the dry sprinkler piping and directed toward the at least one inflatable seal assembly. The dry sprinkler piping is preferably connectable to a sprinkler system associated with the airport concourse via at least one motorized valve, and articulates with movement of the rotunda section whereby, when a threshold high temperature is sensed by the thermocouples, the motorized valve opens to deliver water through the deluge discharge nozzles to maintain the inflatable seal assembly below a failure temperature.

In some embodiments, the passenger boarding bridge further comprises a ventilation duct connectable to an air handling source and extending along substantially an entire length of the passenger boarding bridge to terminate in the cab section. The ventilation duct may comprise a selected number of duct segments corresponding to at least the plurality of telescoping tunnels.

The artisan will appreciate that various components and sealing characteristics as described herein can be used separately or in conjunction with one another in different combinations to accomplish the objectives described herein.

It is one objective of the present invention to provide a substantially air-tight passenger boarding bridge thereby extending the envelope of an airport concourse to a parked aircraft. Given the multiple degrees of freedom inherent in a modern passenger boarding bridge a plurality of methods and means are provided to address particular junctures associated with a degree of freedom, and the ordinarily skilled artisan will appreciate that various components and sealing characteristics as described herein can be used separately or in conjunction with one another in different combinations to accomplish the objectives described herein.

Air barriers are described which may provide a dual purpose as fire and smoke barriers when fire resistive materials are used. A typical aircraft evacuation time in an emergency through the passenger boarding bridges is five minutes. Therefore, the materials must be of selection sufficient to prevent burn through before the egress time of a typical airplane.

Significant air leaks may be present in a passenger boarding bridge rotunda between the rotunda roof and the top of arcuate curtains. A horizontal air barrier comprised of at least two members which rotate relative to each other may be installed below the top of the arcuate curtains with the first member extending from the fixed tunnel of the passenger boarding bridge and contacting the arcuate curtains and terminating in an arc centered on the rotunda rotational axis. The second member extends from edge of the first telescoping structure towards the rotunda center terminating in an arc centered on the rotunda rotational axis. The interface of the two members may by a plurality of overlapping configurations including grooves and reduced additional frictional elements or a butt configuration. The horizontal air barrier may be between an architectural ceiling and the roof of the rotunda or the horizontal air barrier may serve as the architectural ceiling. Preferably the horizontal air barrier is constructed of minimum 26 gauge steel to provide fire resistive properties. When the steel is used the horizontal barrier edges may be capped with elastomeric material to avoid scuffing and wear against metal contact, but this must be balanced against a fire resistivity and selection of horizontal barrier member interface.

Another significant leakage path at the rotunda is between the arcuate curtains and the rotunda floor. This leakage path may be sealed by employing raised rotunda floor with a pliable contact material below the raised floor thereby providing an air barrier between the arcuate curtains and the rotunda floor.

The arcuate curtains themselves are a leakage path as they are typically constructed of overlapping aluminum slats. Air leakage of the arcuate curtains may be improved by installing elastomeric strips mechanically fastened to metal slats while maintaining the same rotational apparatus. The elastomeric strips provide an airtight seal between the metal slaps while also allowing bending of the arcuate curtain with the metal strips providing vertical structural support.

The horizontal air barriers, raised floor, and arcuate curtain improvements described for the rotunda may also be installed at the rotatable cab section at the aircraft. A first passageway tunnel connects to the rotunda by a lower pivot and rotates in a vertical plane relative to the rotunda. Flexible bellows may be mounted to the exterior of the rotunda and the exterior of the first telescoping tunnel. A flexible bellows may instead be installed between the interior of the rotunda and the interior of the first telescoping structure.

At a movable juncture, such as between the rotunda and the passageway tunnel it is preferable to provide expandable seals comprised of inflatable elastomeric bladders which remain clear between moveable elements of the rotunda and tunnel sections. movement is required and deploy to create an air barrier when movement ceases and an air barrier is desired. Inflatable bladders are well suited to this application which can be deflated and contracted when movement is required and inflated and expanded to contact at least two structures or sections thereby forming an air barrier when required. The expandable seal may be comprised of a plurality of inflatable bladder seals to accommodate geometry and apparatus. The inflatable seals may be expanded by a fluid, preferrable a gas, and preferably compressed air.

Significant air leaks may also be present between the telescoping passageway tunnels. Given the size and tolerances the sliding structures are not well suited to fixed seals which remain in constant contact between two sliding surfaces thereby increasing the potential for binding, friction, and scratching of architectural finishes. Expandable seals which can be contracted for movement and expanded to provide an air barrier as previously described are also well suited for this application. Expandable seals may be installed between the walls, ceilings, and roofs of overlapping and overlapped telescoping tunnels.

The maximum temperature of elastomeric materials is 400° F. where flame temperatures of aviation fuel fires may exceed 2,000° F. The seals described may be installed in locations subject to abrasion, tearing, sun exposure, thermal cycling, and inflation and deflation cycling. Compounds suitable for flexibility and maximum temperature such as S60223, a silicone compound, are preferred for use in inflatable bladders and other flexible seals and pads where fire resistive properties are required. in inflation and deflation cycling, abrasion and tearing. When fire resistivity is not a consideration other elastomers such as EPDM may be used to improve sun and weather exposure durability. Elastomers and silicone materials may be used in conjunction with other fabric materials such as Dacron or Nylon to improve characteristics of the seals where installed. For instance, expandable seals between telescoping sections will likely not have significant sun exposure, where inflatable bladders and pads contacting the aircraft will be subject to sun and weather exposure. Discussion of material is not meant to limit selection of materials, but to illustrate possible selections for use in the range of seals. Material selection for particular seals may be optimized by those skilled in the art of material selection.

Additionally, a cooling means to prevent the seal from failing before passengers can egress may be employed such as a deluge fire sprinkler between the opening of the overlapping telescoping tunnel sections and directed at the inflatable seals to maintain a temperature below the failure temperature of the elastomeric seals. Thermocouples located near the telescoping seals may activate fire sprinkler valves through a control panel. Given the complexity of passenger boarding bridge movement, exterior location of piping, and freezing temperature of water the fire sprinkler piping may be comprised of a water source, glycol piping along the fixed walkway section, and transition to dry sprinkler piping through the rotational joint requirements of the passenger boarding bridge. When activated valves between the water and glycol piping and between the glycol and dry piping open thereby delivering glycol or water to the elastomeric seals during a fire emergency. The dry piping may be insulated and heat traced in extreme cold climates to limit the potential for freezing constriction of the piping.

While passenger boarding bridge awnings which extend to aircraft are the subject of significant prior art, air gaps remain between the awning and the aircraft and also between the floor edge of the cab and the aircraft. It is advantageous to install expandable seals on the face of the retractable awning. These expandable seals may be inflatable air bladders which inflate to an expanded state to contact the aircraft skin when deployed and deflate to a contracted state when not used. An inflatable seal mounted to the underside of the cab floor near the terminus of the cab floor is also advantageous which is shielded from weather when not in use, allows a hard walking surface for passengers, and which provides an air barrier between the cab floor and the aircraft. Inflatable seals may also be installed on the face of fixed padded bumpers which also may be present on the passenger boarding bridge cab. A mechanical retraction and extension system may also be used in lieu of the underfloor inflatable seal.

Inflatable seals may expand with ambient or fire driven temperature when deployed by heating of the internal gas Pressure relief valves connected to the inflatable bladders relieve pressure under such conditions. Pressure sensors are also described which may be used to inflate the seals to a predetermined pressure to reduce the risk of damage to the passenger boarding bridge structures, aircraft, and seals.

Because the passenger boarding bridge as described is airtight a source of breathing air is required for passengers transiting or queueing inside the boarding bridge. A telescoping ventilation duct may be provided from a concourse to end of a passenger boarding bridge.

Because tempered air may be delivered to the extension part of the passenger boarding bridge and in light of the disclosures to extend the concourse building envelope to the aircraft compliance with energy codes may be required. As such insulative materials may be required throughout the passenger boarding bridge shell.

When the gate door is open between the concourse and the passenger boarding bridge the aircraft service doors on the passenger levels must be closed to complete the envelope seal.

BRIEF DESCRIPTION OF THE DRAWINGS

FIG. 25.

Figure 1:
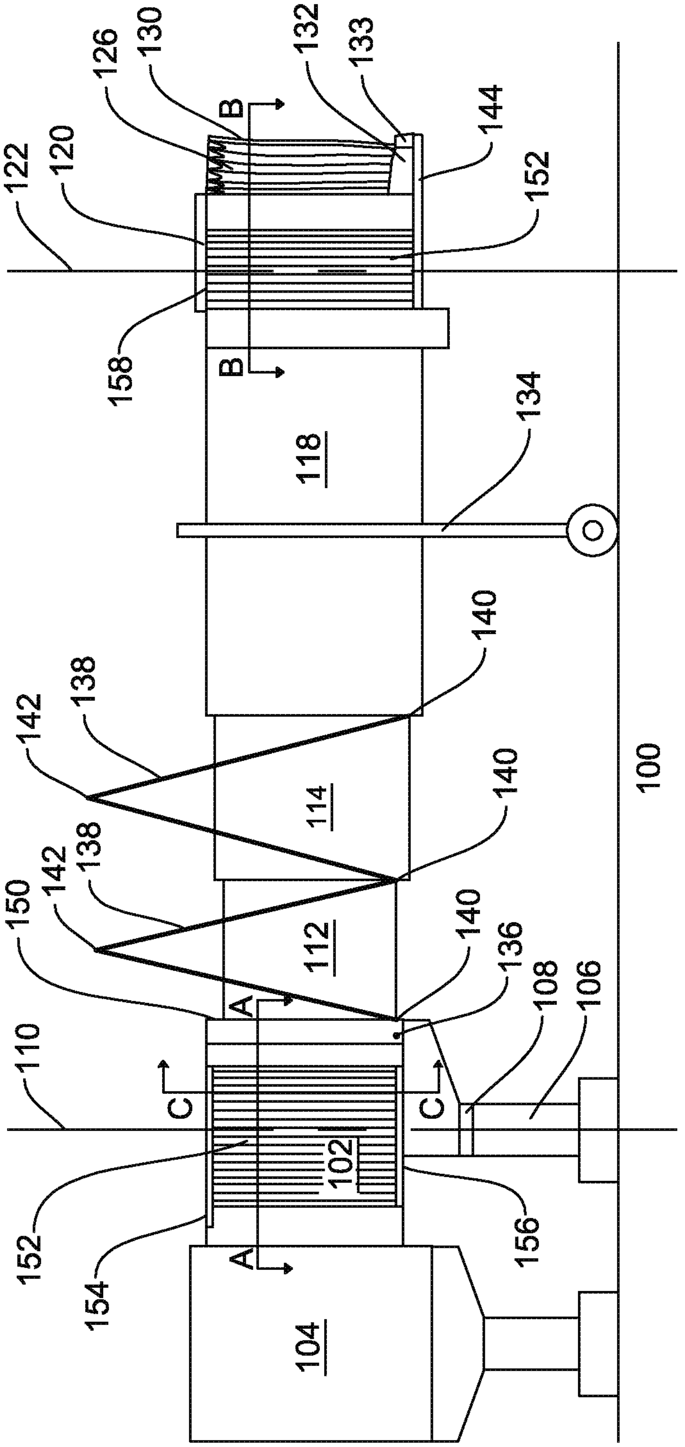
FIG. 1 (PRIOR ART)
FIG. 1 is a side view of a prior art passenger boarding bridge with a retracted awning.
Figure 1A:
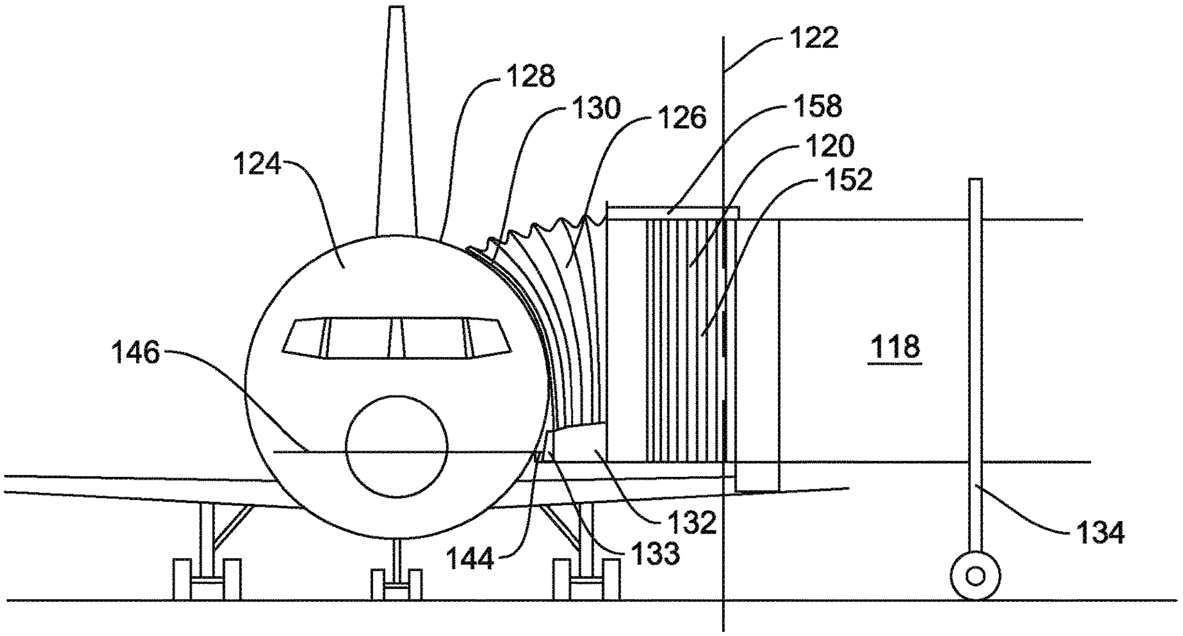
FIG. 1A (PRIOR ART)
FIG. 1A is a partial frontal view of a prior art passenger boarding bridge docked with an aircraft.
Figure 1B:
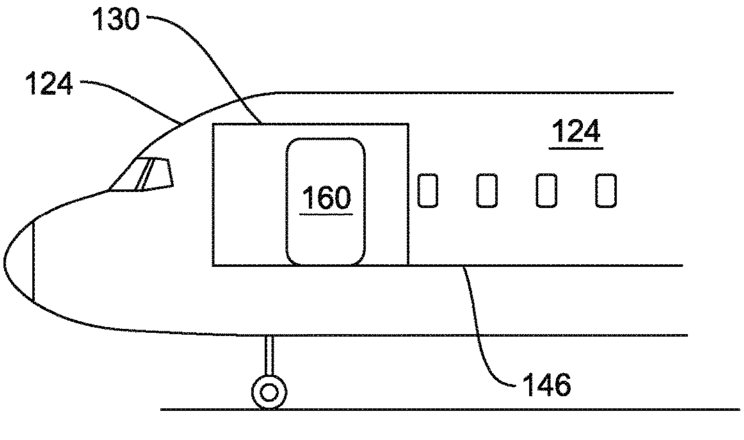
FIG. 1B (PRIOR ART)
FIG. 1B is a partial side view of an aircraft with the outline of a prior art passenger boarding bridge.

Before explaining the disclosed embodiments of the present disclosures in detail, it is to be understood that the disclosures shall not limited in its application to the details of the particular arrangement shown, since there may be other embodiments of the disclosure. Also, the terminology used herein is for the purpose of description and not of limitation.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

Figure 2:
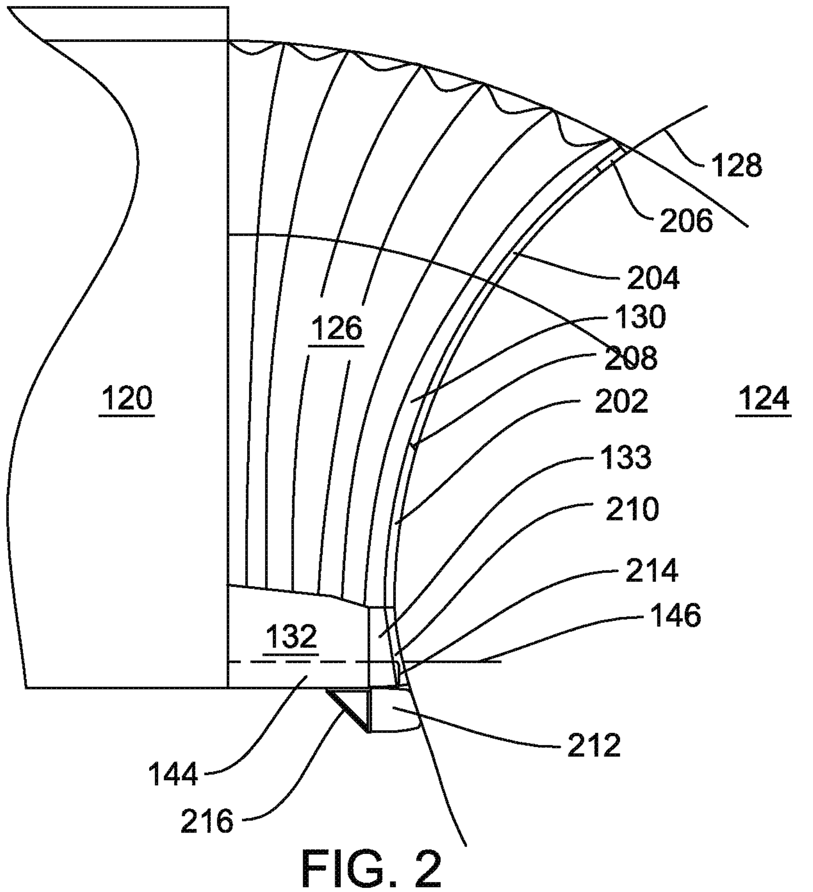
FIG. 2 is an enlarged side view partially showing a deployed awning, a disclosure, and a portion of the exterior of an aircraft fuselage in cross section.
Figure 2A:
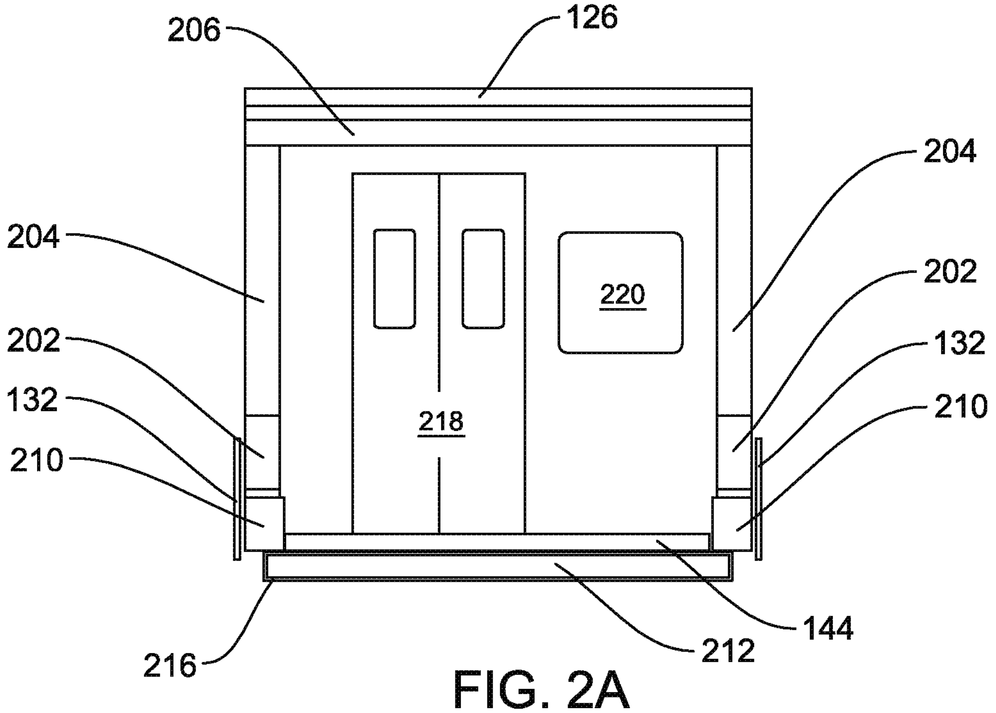
FIG. 2A is a partial end view elevation of a passenger boarding bridge cab with a disclosure.

FIG. 2 and FIG. 2A illustrate an enlarged end view of rotatable cab 120 and awning 126. A disclosed improvement of passenger boarding bridge 100 is the addition of inflatable bladders 202 and 204 attached to the vertical face of awning pad 130 and inflatable bladder 206 attached to the horizontal face of awning pad 130. Inflatable bladder seals 202, 204, 206 may be comprised of a single inflatable bladder or a plurality of inflatable bladders to accommodate the curvature of aircraft 124 exterior fuselage 128. The abutting ends of inflatable bladders 204 and 206 may be wedged to overlap each other in a joint 208. Additional inflatable bladders 210 may be attached to fixed pads 133 to improve the air barrier with fuselage 128. Inflatable bladder 212 is located beneath cab floor 144 and below cab floor edge 214 and extends along the aircraft 124 facing side of cab floor 206. An inflatable bladder seal 212 is mounted to a frame 216 which is attached to the underside of cab floor 144. Prior art double door 218 and prior art operator window 220 are shown for reference.

Figure 3:
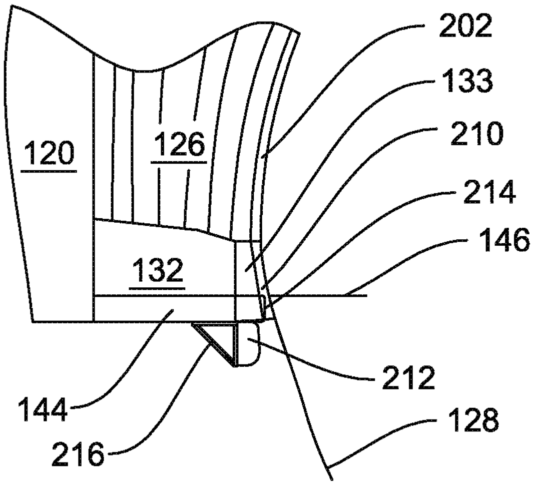
FIG. 3 is a partial side view of a passenger boarding bridge cab floor lip illustrating a disclosure

Now turning to FIG. 3 inflatable bladder 212 is shown deflated in a contracted position behind cab floor edge 214. The operation of inflatable bladders 202, 204, 206, 210, and 212 is described below.

Figure 4:
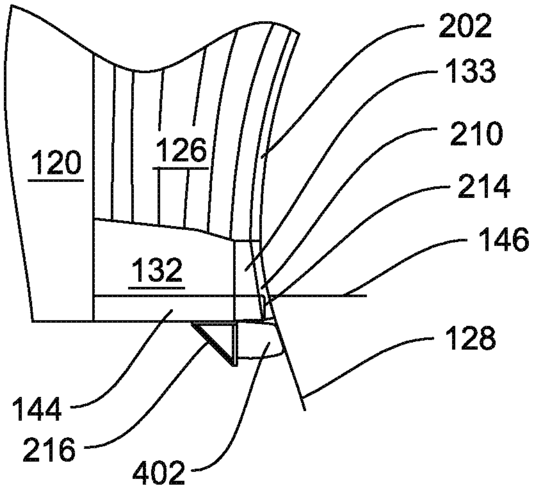
FIG. 4 is a partial side view of a passenger boarding bridge cab floor and a fixed bumper pad.

In FIG. 4 an alternative to under floor inflatable bladder 212 is illustrated. A fixed pad bumper 402 of predetermined shape which may be mounted to support frame 216 previously disclosed. When docked with an aircraft the padded bumper 402 may slightly deform and is substantially bounded by the bottom of cab floor 144 and contiguously contacts aircraft fuselage 128 forming an air barrier between the cab floor 144 and aircraft fuselage 128.

Inflatable bladders 202, 204, 206, 210 and deformable pads are subject to sun exposure, thermal cycling, use cycling, abrasion, and tearing in addition to fire resistivity requirements. Inflatable bladder 212 under floor 144 are subject to the same conditions, but may incur less sun exposure. Material selection for these seals may be from the selection noted in the summary, but may also be selected and optimized for these conditions by those skilled in the art of material selection and seals.

Figure 4A:
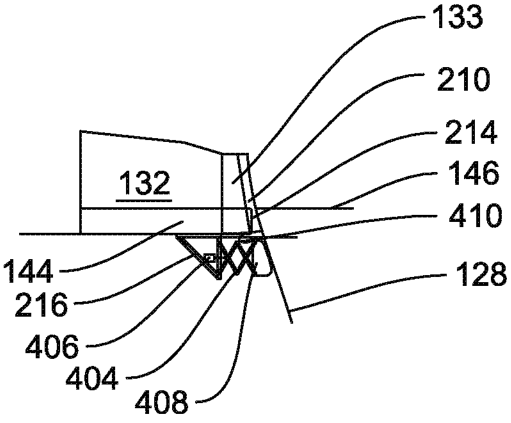
FIG. 4A is a partial side view of a passenger boarding bridge cab floor and retractable pad with mechanical extension means.

In FIG. 4A an alternate embodiment is disclosed with mechanical actuator 404 powered by motor 406 which extends pad 408 to contact fuselage 128 and retract pad 408 for passenger boarding bridge 100 movement. An air impermeable fabric sheet 410 of predetermined shape and material such as Dacron, is attached below cab floor 144 and is fastened and sealed contiguously by means such as strips of metal and screws adhesive or caulk screws the width of the cab floor 144 thereby providing an air barrier between cab floor 144 and aircraft fuselage 128.

Figure 5:
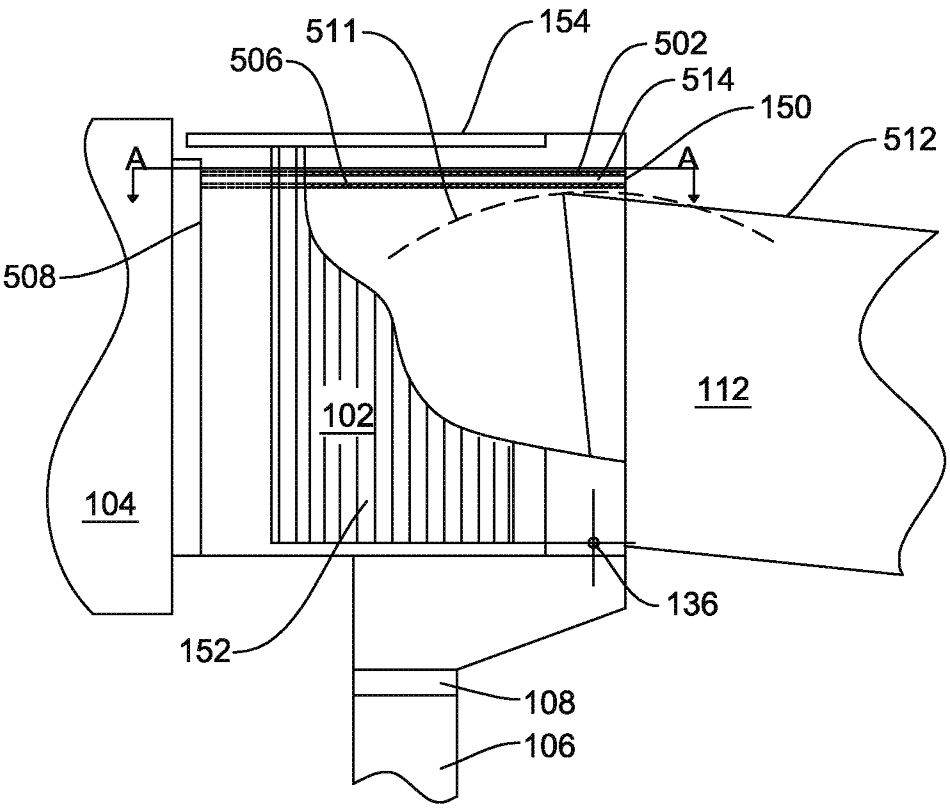
FIG. 5 is an enlarged side view partially in elevation and partially in section of a passenger boarding bridge rotunda.

FIG. 5. is an enlarged section of rotunda 102 and illustrates a horizontal barrier 502 between rotunda roof 154 and a prior art architectural ceiling 506 and extending from the inboard wall 508 to the outboard wall 150 of rotunda 102. The horizontal barrier 502 is located above the movement arc 511 of the top 512 of first telescoping tunnel 112 as it rotates in a vertical plane about transverse horizontal pivot 136 to avoid interference. Architectural ceiling 506 may also be located above the movement arc 511 of the telescoping tunnel top 512. In an alternate embodiment horizontal barrier 502 may also serve dual purpose as architectural ceiling 506. Thermal insulative elements 514, such as polyurethane foam, may be inserted in the interstitial space between architectural ceiling 506 and horizontal barrier 502 or may be attached to a dual purpose horizontal air barrier 502.

Figure 6:
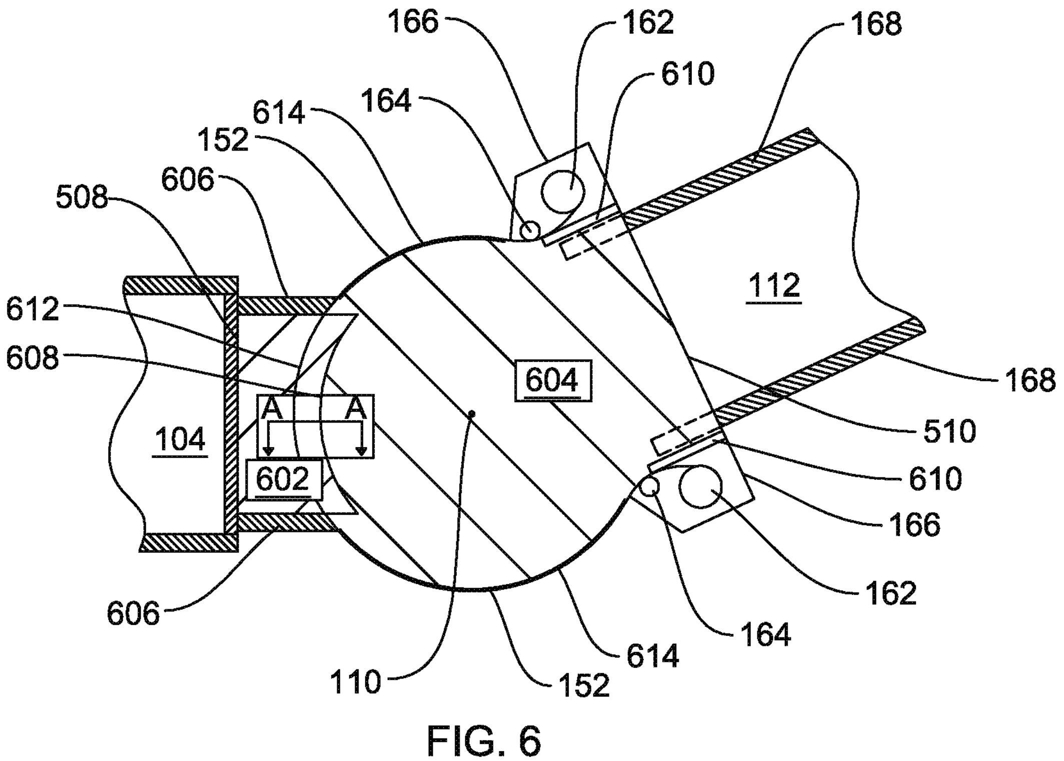
FIG. 6 is a horizontal section looking downward through a passenger boarding bridge rotunda indicated by arrowed line A-A, FIG. 5.

FIG. 6. Illustrates a horizontal section taken at arrowed line A-A in FIG. 5 through the rotunda 102 below rotunda roof 154 and above horizontal barrier 502. Horizontal barrier 502 is comprised of a minimum of two horizontal barriers 602 and 604 of predetermined shape. Horizontal barrier 602 is fixed in position with respect to building structure 104 and is bounded by the end wall 508 on the inboard side of rotunda 102, inboard rotunda walls 606, arcuate curtains 152, and radial arc 608 centered on rotational axis 110 with projections from fixed rotunda walls 606. Horizontal barrier is fastened by fastening means such as screws and brackets and sealed by means of metal strips and adhesive or caulk, or adhesive tape to inboard wall 508 and rotunda walls 606. Horizontal barrier 604 rotates about axis 110 and is attached to the rotational portion of rotunda 102 and is bounded by rotunda exterior wall 510, outboard rotunda rotational walls 610, and radial arc 612 centered on rotational axis 110. Horizontal barrier is attached to the underside of rotunda roof Architectural ceiling 506 and insulation 514 members are similarly divided and shaped as horizontal barriers 602 and 604 to facilitate movement. Horizontal barrier 502 and component horizontal air barriers 602 and 604 are preferably constructed of minimum 26 ga. steel sheet metal which is well known in building and fire codes to function as an air barrier, smoke barrier, and/or a fire barrier; but may be constructed of any material providing these functions or at a minimum an air barrier. Horizontal barriers 602 and 604 may each be comprised of a plurality of subsections to allow ease of installation especially in retrofits of previously installed passenger boarding bridges.

Figure 7:
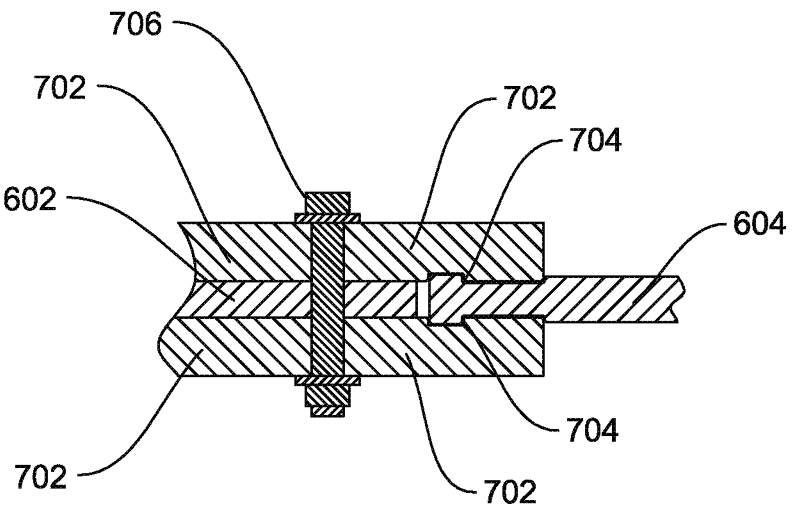
FIG. 7 is a section fragment at the interface of two disclosed horizontal air barriers as indicated by arrowed line A-A, FIG. 6.

FIG. 7 illustrates a section of an alternate embodiment taken at arrowed line A-A in FIG. 6 at the interface of horizontal barriers 602 and 604. Calipers 702 are fastened to horizontal air barrier 604 and overlap rotating horizontal air barrier 602. Calipers 702 contact horizontal air barriers 602 thereby forming an airtight seal between air barrier 602 and air barrier 604 with sufficiently light pressure thereby allowing rotational movement of the horizontal barriers 602 and 604 with respect to each other. A groove 704 may be provided to improve the barrier seal. A fastener 706 is shown for example, one of a plurality of fasteners, but any method of attachment may be used such as welding, adhesives, or clips which are well known to those skilled in the art of fastening.

The disclosed horizontal barriers 602 and 604 may be mounted to their respective structures by any number of fastening means such as clips, channels, bar stock, screws, welding, and the like.

Figure 8:
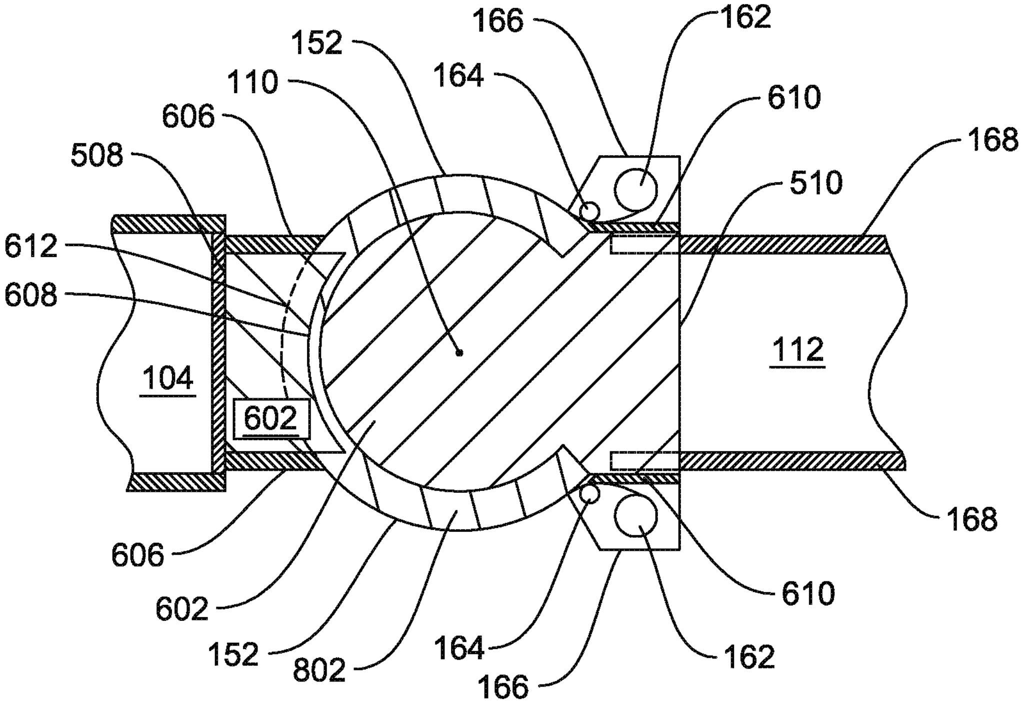
FIG. 8 is a horizontal section looking downward at a rotated passenger boarding bridge rotunda as indicated by arrowed line A-A, FIG. 5.

FIG. 8 illustrates a section, taken at arrowed line A-A in FIG. 5, of an alternate embodiment of horizontal barriers 602 and 604 and also illustrates rotunda 102 and first telescoping tunnel 112 in a straight position. An elastomeric edge 802 may be fastened along the arcuate wall 154 contact range underneath horizontal barrier 604 and extending to contact arcuate curtains 152 to improve the air seal and reduce abrasion of arcuate curtains 152.

Figure 9:
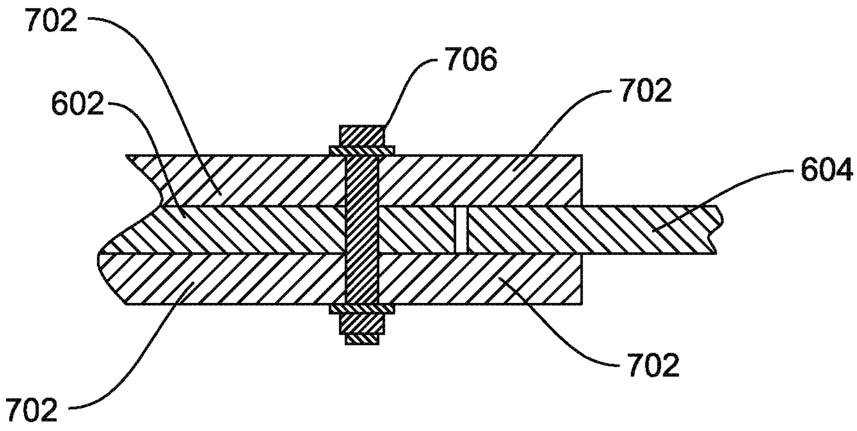
FIG. 9 is a section fragment at the interface of two disclosed horizontal air barriers as indicated by arrowed line A-A, FIG. 6.

FIG. 9 illustrates a section, taken at arrowed line A-A in FIG. 6, of an alternate embodiment of the barrier seal provided by horizontal air barriers 602 and 604 by calipers 702 without a groove.

Figure 10:
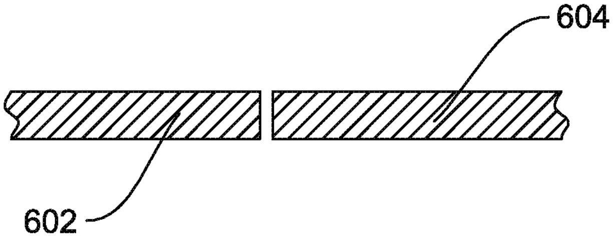
FIG. 10 is a section fragment at the interface of two disclosed horizontal air barriers as indicated by arrowed line A-A, FIG. 6.

FIG. 10 illustrates a section, taken at arrowed line A-A in FIG. 6, of an alternate embodiment with horizontal air barriers 602, 604 without calipers or grooves in a butt configuration. This embodiment may allow more air leakage than other disclosed embodiments due to the gap required to avoid interference between horizontal air barriers 602, 604 while moving.

Figure 11:
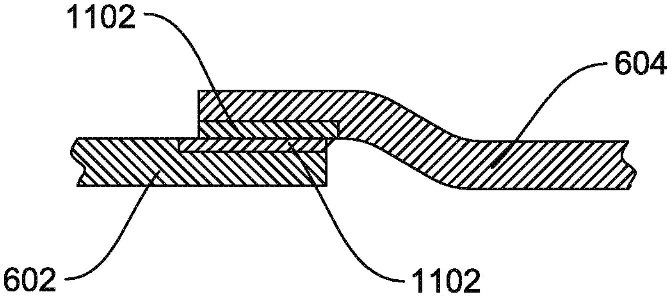
FIG. 11 is a section fragment at the interface of two disclosed horizontal air barriers as indicated by arrowed line A-A, FIG. 6.

FIG. 11 illustrates a section, taken at arrowed line A-A in FIG. 6, of an alternate embodiment of the disclosure with horizontal air barriers 604 shaped to overlap horizontal barrier 602 to form an airtight seal. A second contact element 1102 such as Teflon may be attached to barriers 602 and 604 to eliminate metal to metal contact, reduce friction, or allow ease of replacement as the contact material wears.

Figure 12:
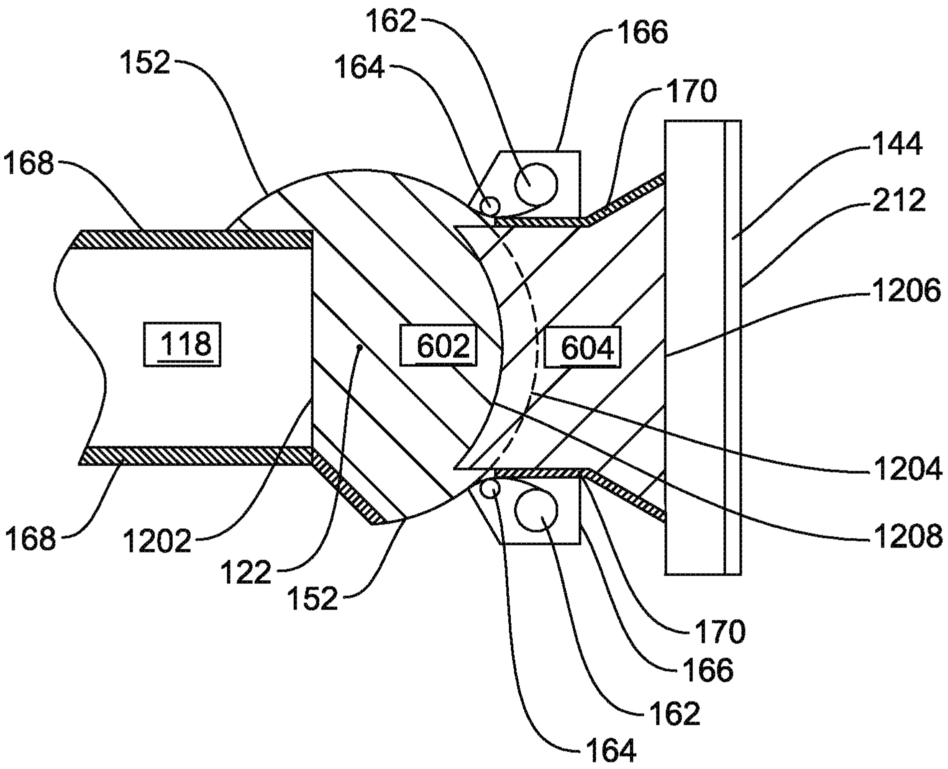
FIG. 12 is a horizontal section looking downward through a passenger boarding bridge rotunda as indicated by arrowed line A-A in FIG. 1 with improvements.

FIG. 12 illustrates horizontal air barriers 602, 604 installed at rotatable cab 120. Horizontal barrier 602 is fixed in position bounded by the telescoping tunnel 118 end drop wall 1202 of, arcuate curtains 152, and radial arc 1204 centered on rotational axis 122. Horizontal barrier 604 is bounded by cab drop wall 1206, cab outboard fixed walls 170, radial arc 1208 centered on axis 110 with projections from rotational walls 170. The embodiments disclosed for rotunda 102 horizontal air barrier 502 in FIG. 7, FIG. 8, FIG. 9, FIG. 10 and FIG. 11 may also be applied at the cab 120 as well as materials and means previously disclosed.

Figure 13:
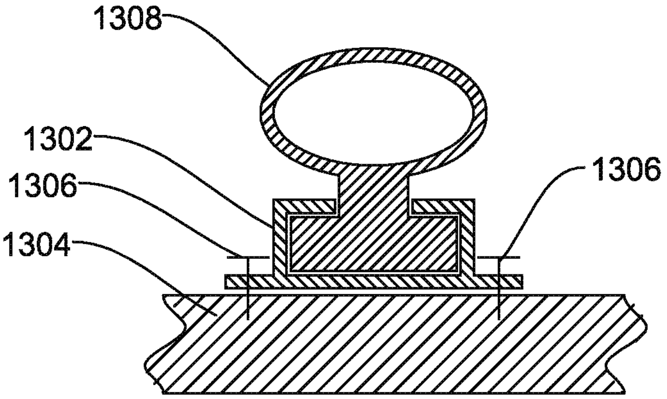
FIG. 13 is an enlarged illustrating an inflatable seal assembly.

FIG. 13 details an enlarged cross section view of an inflatable seal assembly 1300. A bracket 1302 of cross section shown is mounted to a structure 1304 which may be a wall or another structural element by a plurality of fastening means 1306. Inflatable bladder 1308 has cross section shaped to interlock with bracket 1302 and has void space which accepts a fluid, preferably a gas, and preferably compressed air Inflatable seal assemblies are largely installed in spaces between rotunda 102 and tunnels 112, 114, 118. These locations are not subject to significant sun exposure, but may incur thermal cycling, use cycling, abrasion, and tearing in addition to fire resistivity requirements. Material selection for these seals may be from the selection noted in the summary, but may also be selected and optimized for these conditions by those skilled in the art of material selection and seals.

Figure 14:
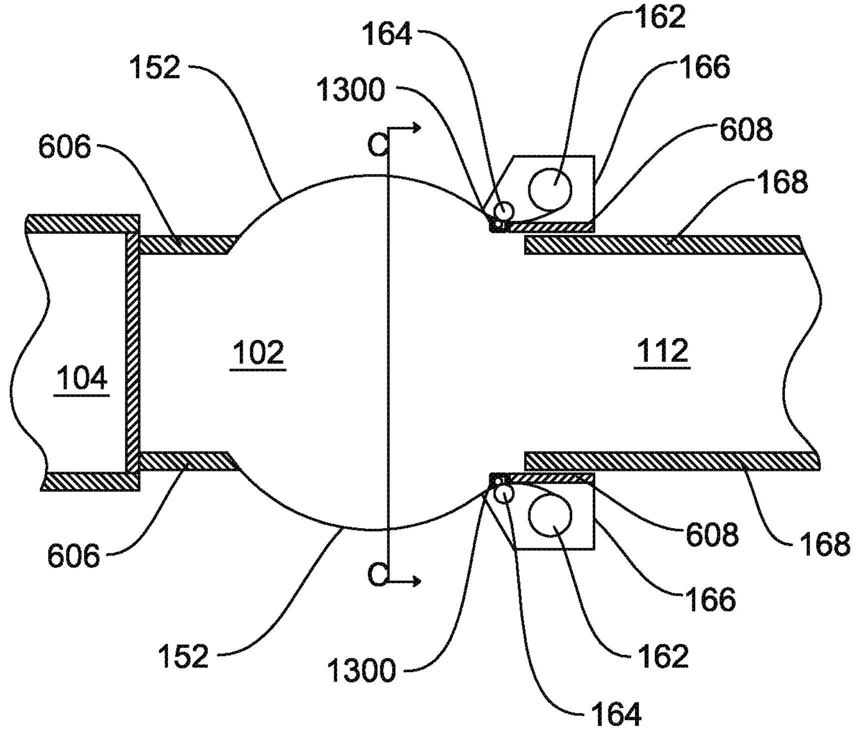
FIG. 14 is a horizontal section looking downward through a passenger boarding bridge cab as indicated by arrowed line B-B in FIG. 1 illustrating a disclosed inflatable seal assembly.

Now turning to FIG. 14 a horizontal section through rotunda 102 looking down at arrowed line A-A in FIG. 1. Inflatable seal assembly 1300 is shown mounted to outboard fixed rotunda wall 608 to provide an air barrier between arcuate curtain 152 and fixed rotunda wall 608. Inflatable seal assembly 1300 extends from the rotunda floor 156 to the bottom of horizontal barrier 502.

Figure 15:
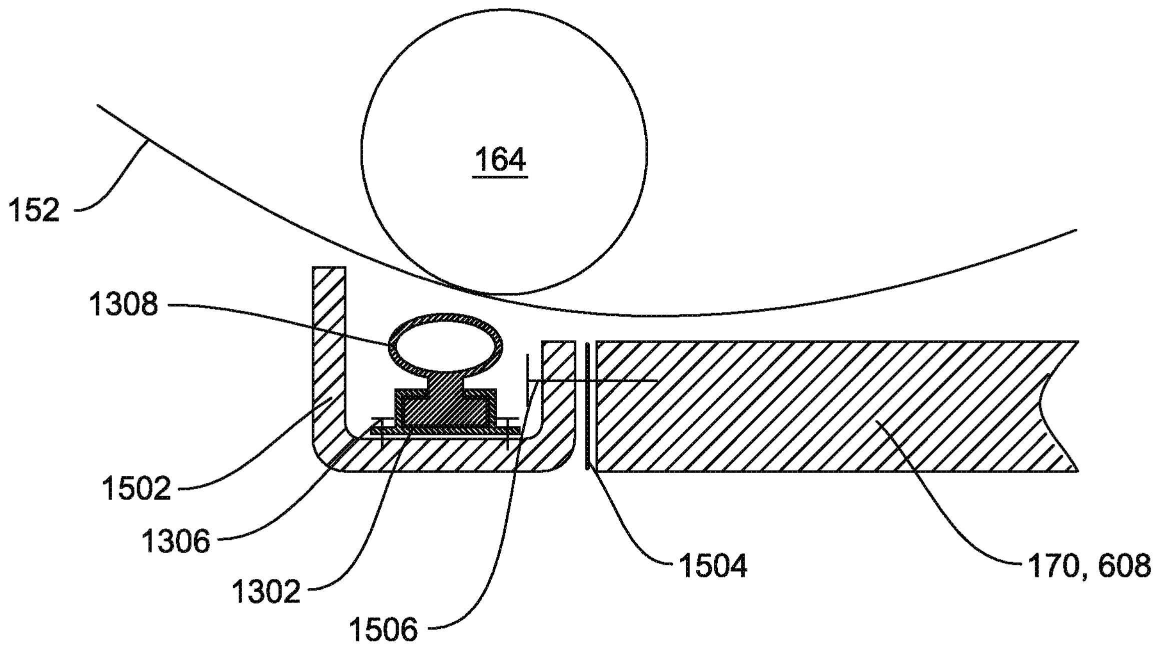
FIG. 15 is a partial enlarged section at a passenger boarding bridge rotunda indicated by arrowed line C-C in FIG. 1 illustrating a deflated inflatable seal assembly.

FIG. 15 illustrates an enlarged cross section view of inflatable seal assembly 1300 at rotunda 102 in a deflated state. Channel 1502 is mounted to rotating rotunda wall 608 with gasket 1504 between channel 1502 and fixed rotunda wall 608 by fastening means 1506. Inflatable seal assembly 1300 is fastened to housing channel 1502 by mounting bracket 1302. When inflatable bladder 1308 is deflated fixed outboard rotunda wall 608 can move freely relative to arcuate curtain 152 when passenger boarding bridge 100 rotates.

Figure 15A:
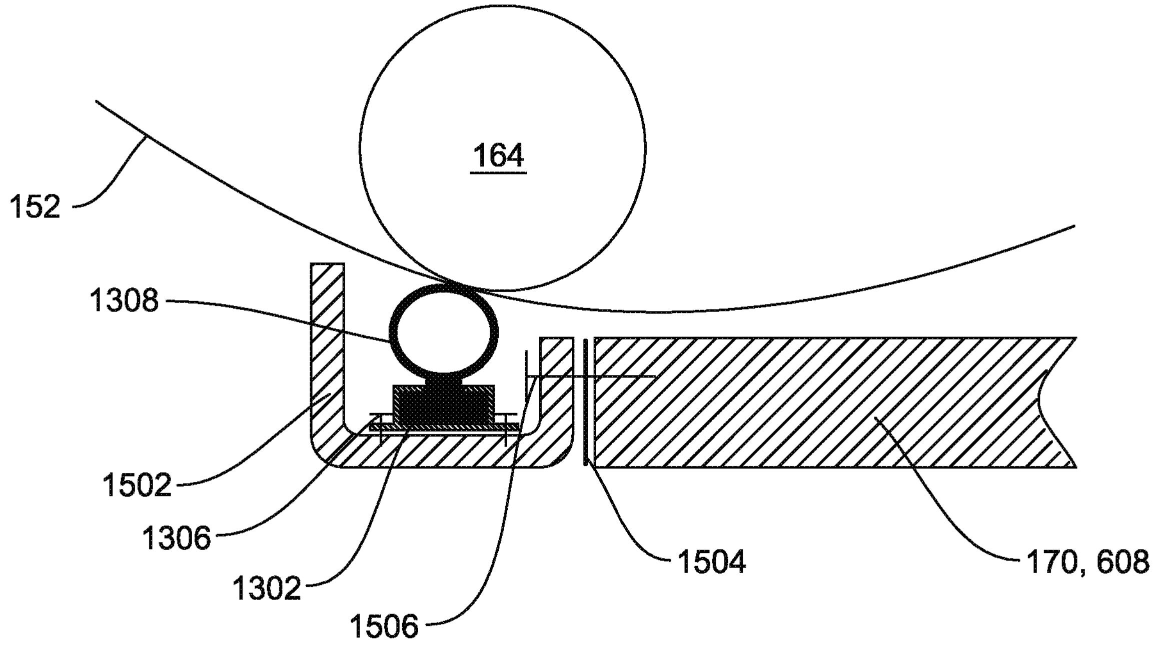
FIG. 15A is a partial section at a passenger boarding bridge rotunda indicated by arrowed line C-C in FIG. 1 illustrating an inflated seal assembly.

FIG. 15A illustrates an inflatable bladder 1308 in an inflated state contacting arcuate curtain 152. Inflatable bladder 1308 is positioned relative to idler 164 such that arcuate curtain 152 is backstopped by idler 164 and is not substantially deformed by the pressure imparted by inflatable bladder 1308 when inflated. The expanded bladder 1308 in an inflated state contiguously contacts arcuate curtain 124 thereby forming an air barrier between arcuate curtain 124 and outboard fixed rotunda wall 608.

Figure 16:
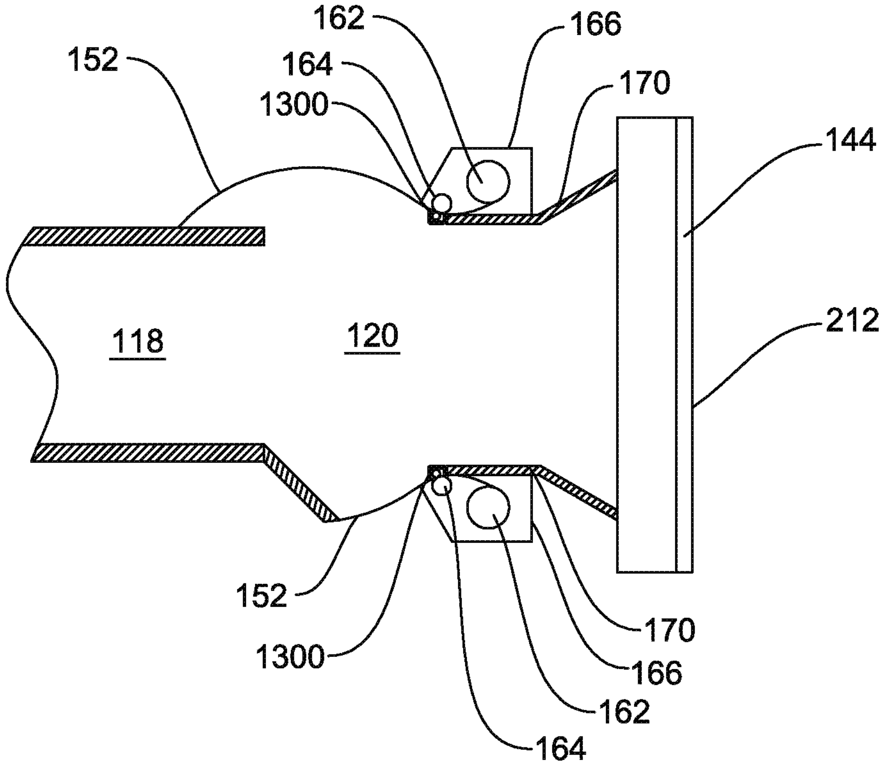
FIG. 16 is a section of a passenger boarding bridge cab taken at arrowed line B-B in FIG. 1 illustrating a seal assembly.

FIG. 16 illustrates a horizontal section through cab 120 looking down at arrowed line B-B in FIG. 1. Inflatable seal assemblies 1300 are mounted to outboard cab wall 170 to provide an air barrier between arcuate curtain 152 and outboard fixed cab wall 170 when inflated. The inflatable seal assemblies extend from the cab floor 144 to the bottom of horizontal barrier 604. When deflated, inflatable seal assembly 1300 allows freedom of movement between arcuate curtain 154 and outboard fixed cab wall 170. Inflatable seal 1300 states are similar to that described in FIG. 15 and FIG. 15A for rotunda 102.

Figure 1C:
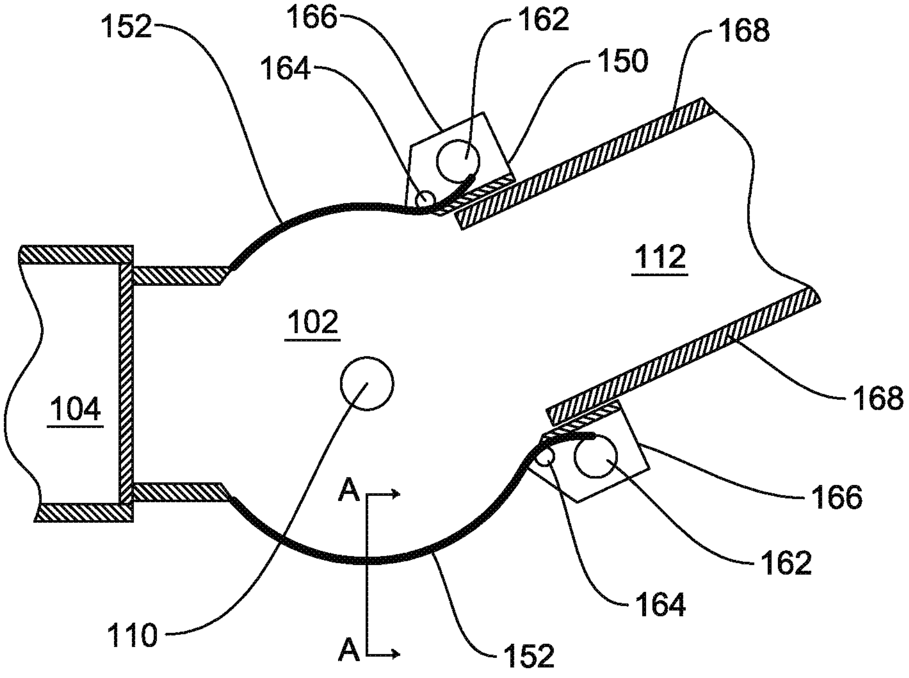
FIG. 1C (PRIOR ART)
FIG. 1C is a partial section of a prior art passenger boarding bridge rotunda taken at arrowed line A-A in FIG. 1.
Figure 1D:
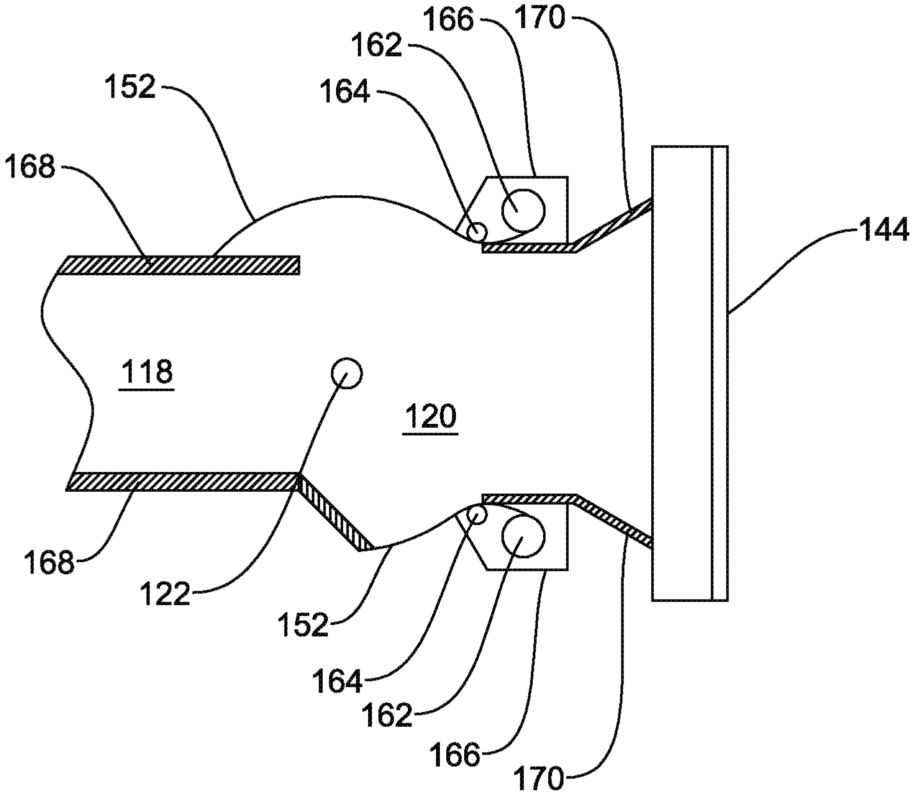
FIG. 1D (PRIOR ART)
FIG. 1D is a partial section of a prior art passenger boarding bridge cab taken at arrowed line B-B in FIG. 1.
Figure 17:
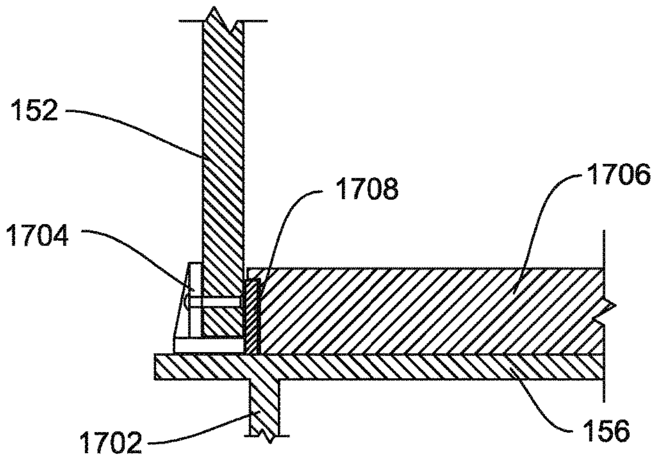
FIG. 17 is a partial section at the bottom of a passenger boarding bridge rotunda illustrating a raised floor seal.
Figure 18:
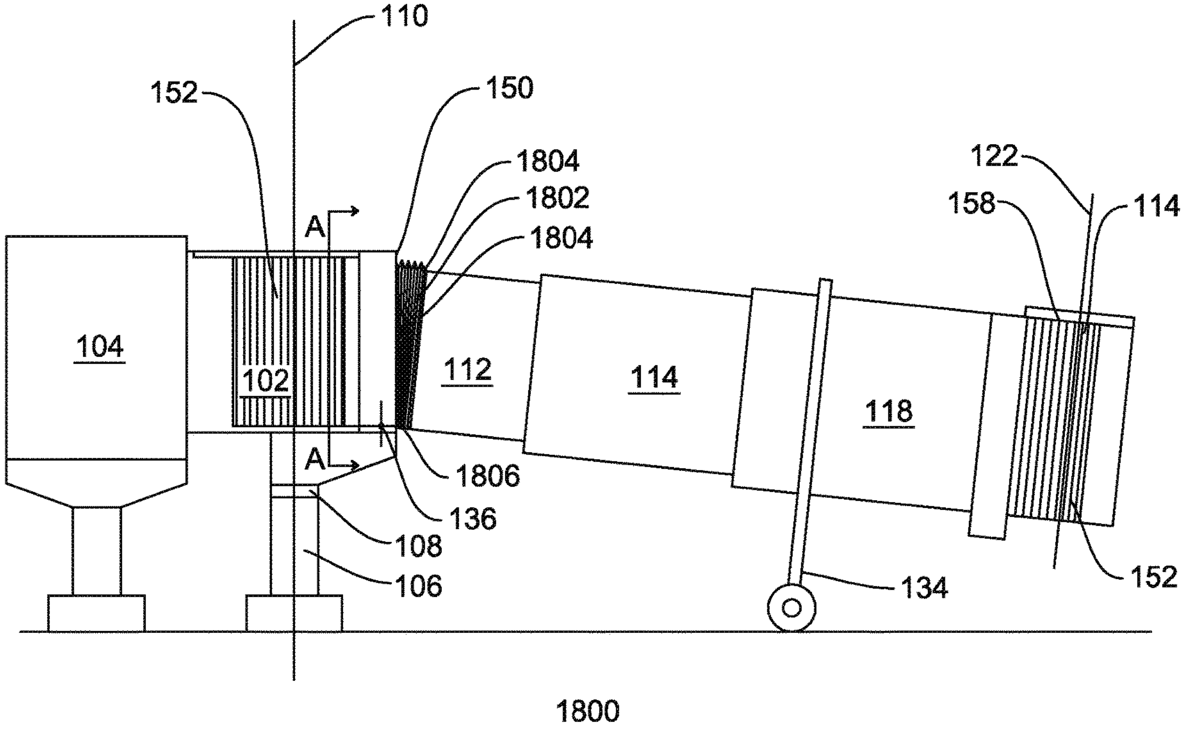
FIG. 18 is a passenger boarding bridge with exterior bellows.
Figure 19:
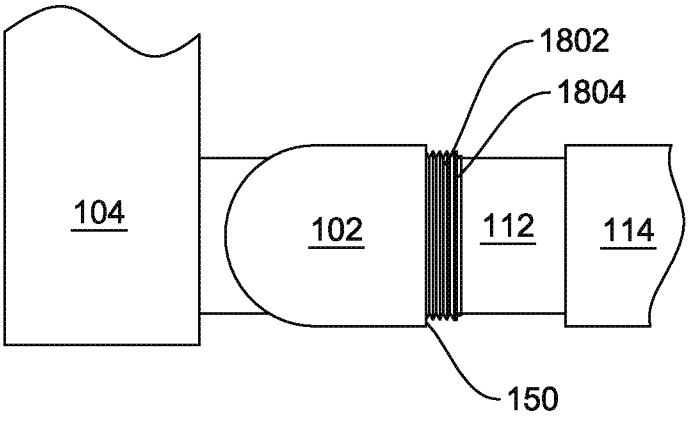
FIG. 19 is a partial top view of a passenger boarding bridge with an exterior bellows.

FIG. 17 illustrates an improvement to provide a substantially airtight passenger boarding bridge in a partial section of the rotunda 102, taken at arrowed line A-A, FIG. 1C. Rotunda floor 156, rotunda floor structure 1702, and arcuate curtains 152 with arcuate curtain guide 1704 are prior art. Raised floor 1706 above and fixed to structural floor 1702 provides an improved air seal between the rotunda floor 1702 and arcuate curtains 152. Raised floor 1706 may be of minimal height of 1" and may be notched to allow insertion of a flexible elastomeric pad 1708 to improve contact between arcuate curtains 152 and raised floor 1706. The provided dimension is meant for an illustration of scale and is not meant to limit the scope of the disclosure.

Figure 20:
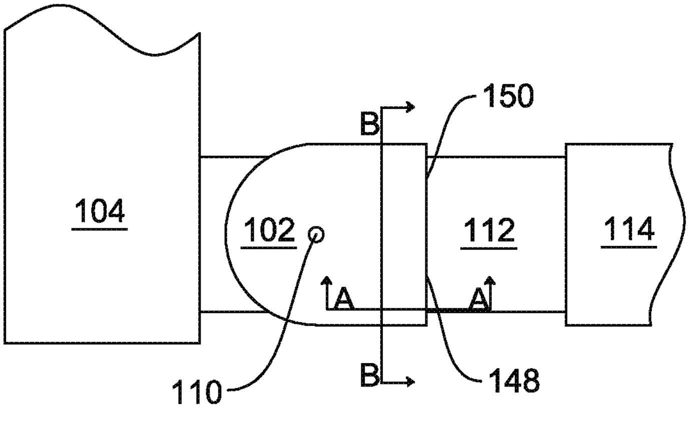
FIG. 20 is a partial top view of a passenger boarding bridge rotunda illustrating arrowed section lines for the location of disclosed embodiments below.

FIG. 20 illustrates a partial top view of the rotunda 102 of passenger boarding bridge 100 and proximal elements to provide the orientation of arrowed line A-A and arrowed line B-B used to illustrate alternate embodiments to provide an air barrier between rotunda 102 and tunnel 112.

Figure 21:
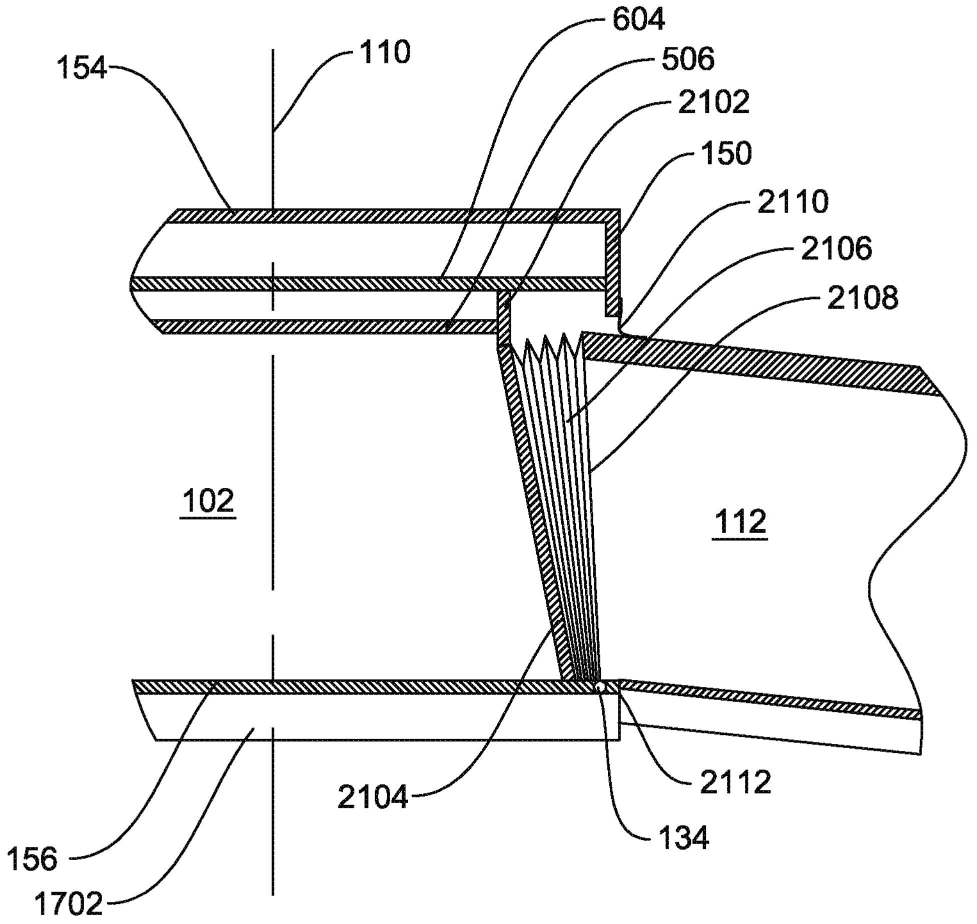
FIG. 21 is an interior section taken at arrowed line A-A, FIG. 20 illustrating an internal bellow seal.
Figure 22:
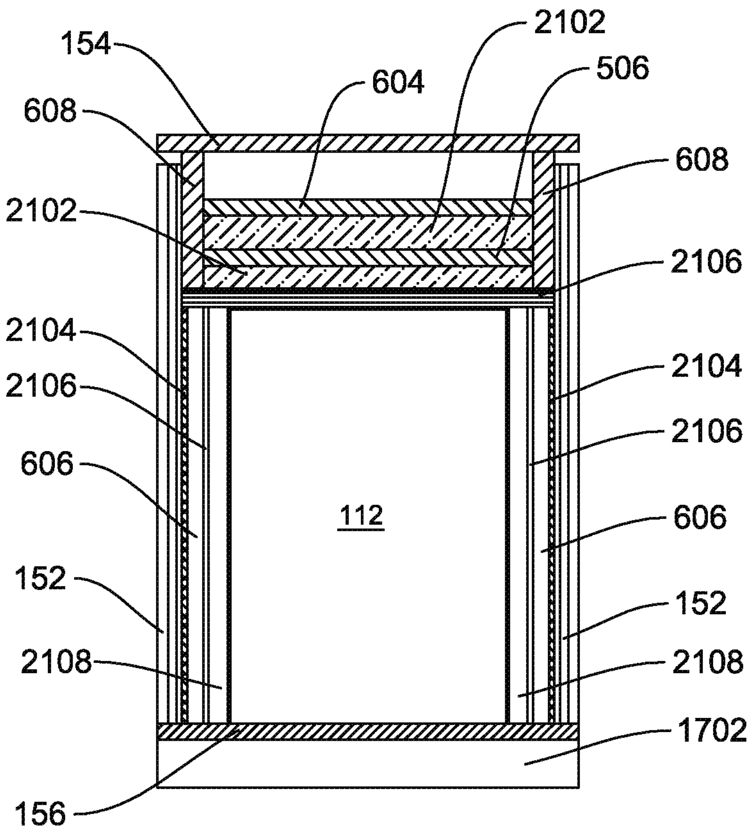
FIG. 22 is an interior elevation taken at arrowed line B-B, FIG. 20 illustrating an internal bellow seal.

In FIG. 21 a partial cross section and partial elevation at the juncture of rotunda 102 and passageway tunnel 112 taken at arrowed line A-A in FIG. 20, and FIG. 22, an elevation, taken at arrowed line B-B in FIG. 20 illustrating another embodiment of an air barrier between rotunda 102 and passageway tunnel 112. Vertical air barrier 2102 fastens to horizontal barrier 502 and extends below architectural ceiling 506. An "L" bracket 2104 extends vertically or slightly angled with respect to and from rotunda floor 156 to horizontal barrier 604. Flexible bellows 2106 attach to "L" bracket 2104 along the sides of rotunda outboard fixed walls 608 and the end 2108, with edges shown as hidden lines, of first telescoping tunnel 112. The exterior gaps between telescoping tunnel 112 and rotunda 102 exterior wall may be weather sealed with prior art weather gasketing 2110 for weather protection. An air barrier at gap at the underside of rotunda 102 and tunnel 112 may be provided with a bellowed seal 2112. Thereby an air barrier between telescoping tunnel 112 and rotunda 102 is provided.

Figure 23:
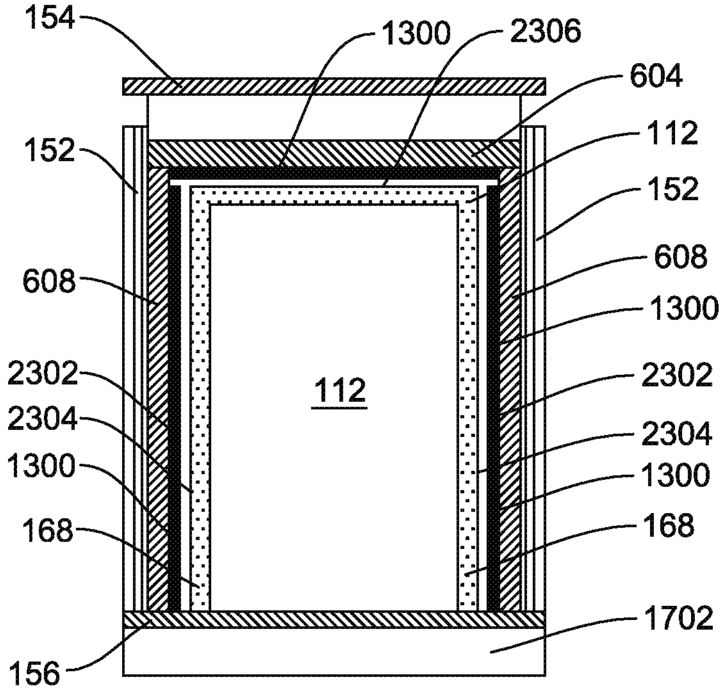
FIG. 23 is an interior section taken at arrowed line B-B, FIG. 20 illustrating an internal inflatable seal assembly.

FIG. 23 illustrates a cross section taken at line A-A in FIG. 20 of another embodiment of an air barrier between the interior of rotunda 102 and first telescoping tunnel 112. Inflatable seal assembly 1300 is fastened to the interior sides 2302 of rotunda walls 608. Inflatable seal assembly 1300 may be attached by a plurality of fasteners 1310 to the interior side 2302 of rotunda walls 608 and underneath horizontal air barrier 604.

Figure 24:
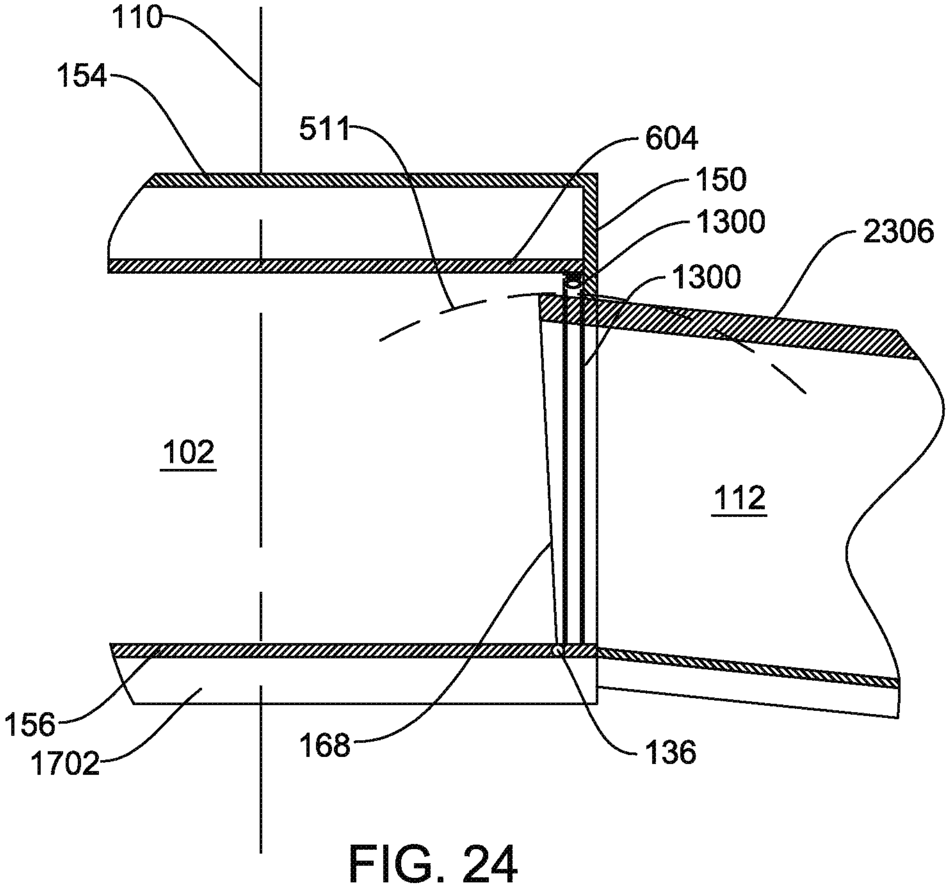
FIG. 24 is an interior elevation taken at arrowed line A-A, FIG. 20 illustrating an internal inflatable seal assembly.

FIG. 24 illustrates a side cross section of taken at line B-B in FIG. 20 illustrates a side cross section of the inflatable seal assembly 1300 at joint 148 described in FIG. 23, Inflatable seal assembly extends from the rotunda floor 156 to horizontal air barrier 604. The cross section view of seal assembly 1300 attached to the underside of horizontal air barrier 604 is shown.

When deployed inflatable bladder 1308 expands to contiguously contact first telescoping tunnel 112 exterior sides 2304 and top 2306 thereby providing an air barrier between rotunda 102 and telescoping tunnel 112. When retracted inflatable bladder 1308 deflates to provide clearance between the exterior sides 2304 and top 2306 of telescoping tunnel 112 thereby allowing telescoping tunnel 112 to freely pivot about 136 without interference between the top 2306 of telescoping tunnel 112 and horizontal barrier 604 during movement through arc 511.

Figure 25:
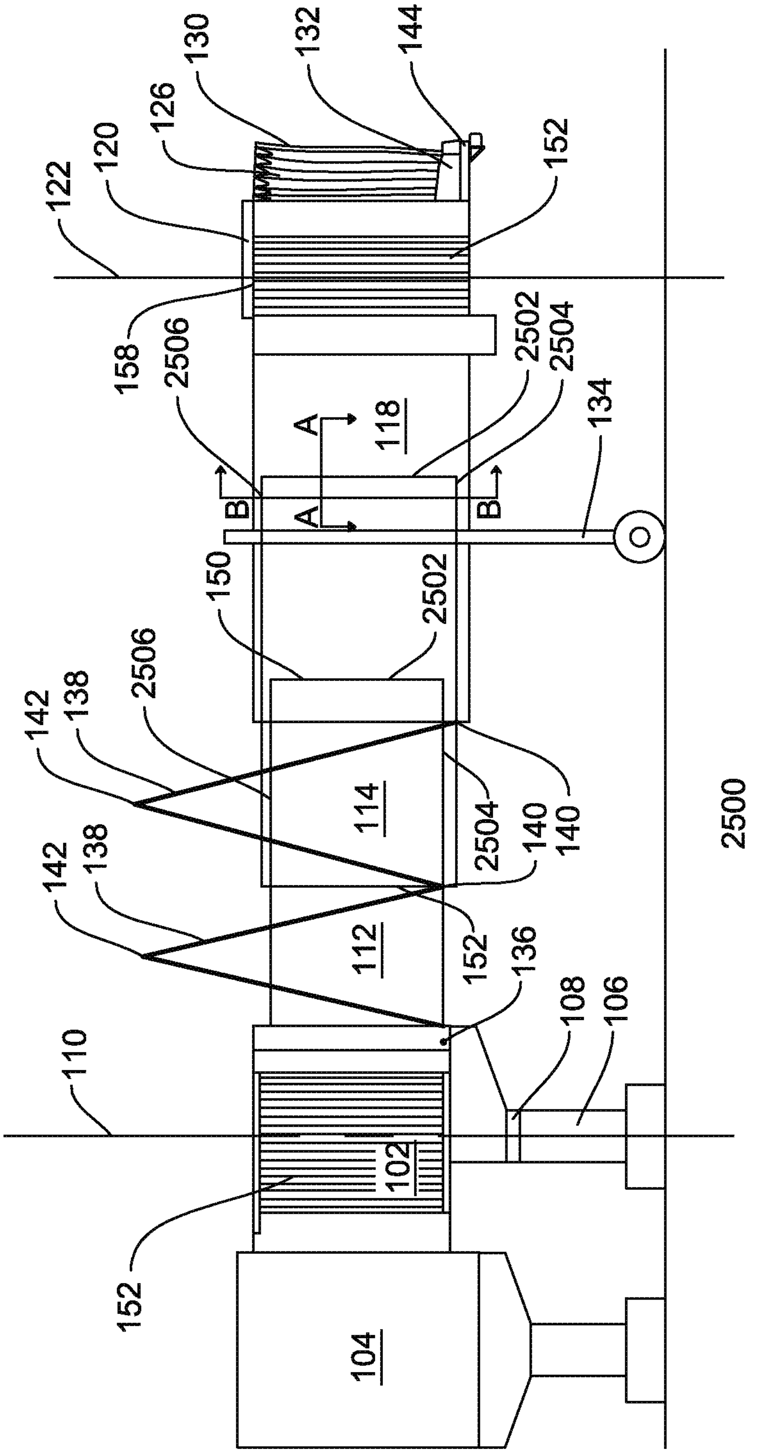
FIG. 25 is a passenger boarding bridge illustrating further detail of internal telescoping tunnels shown as hidden lines.

FIG. 25 illustrates further detail of the passenger boarding bridge 100, FIG. 1 showing the overlap of telescoping tunnels 112, 114 as hidden lines with end 2502, bottom 2504, and tunnel tops 2506.

Figure 26:
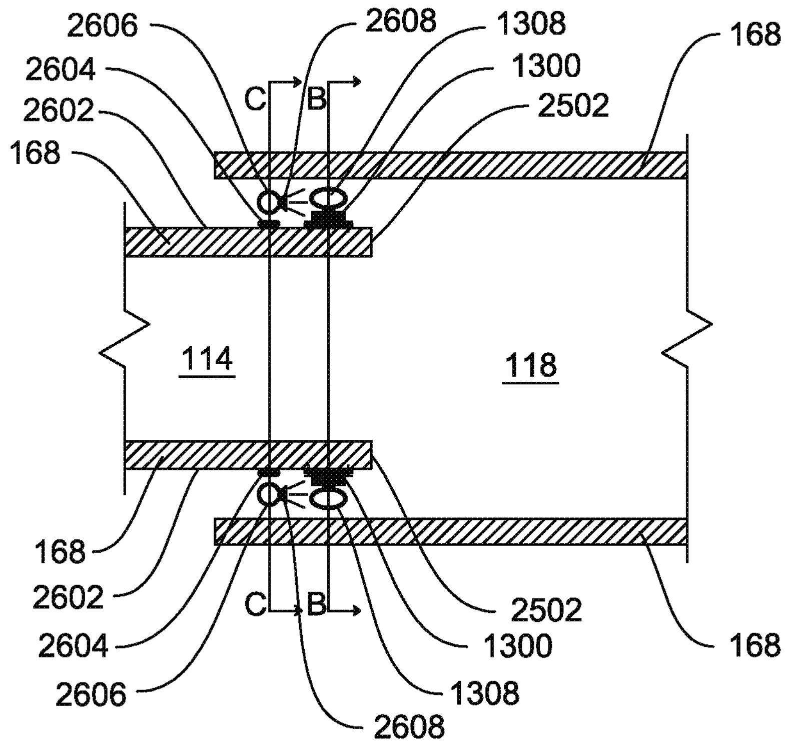
FIG. 26 is a section looking down taken at arrowed line A-A in FIG. 25 at the joint of two telescoping tunnels illustrating an inflatable seal assembly.

FIG. 26 illustrates a horizontal section looking down at line A-A in FIG. 25 at the outboard end 2502 of telescoping tunnel 112 and second telescoping tunnel 114. An inflatable seal assembly 1300 is located near the end 2502 of interior telescoping tunnel 112 and fastened to the exterior sides 2602 of walls 168 and across the top 2506 of telescoping tunnel 112. Thermocouples 2604 and dry sprinkler pipe 2606 are attached to the exterior 2602 wall 168 of overlapped tunnel 112. Deluge sprinkler heads or nozzles 2608 connect to dry sprinkler pipe 2606 and are directed towards seal assembly 1300

Figure 26A:
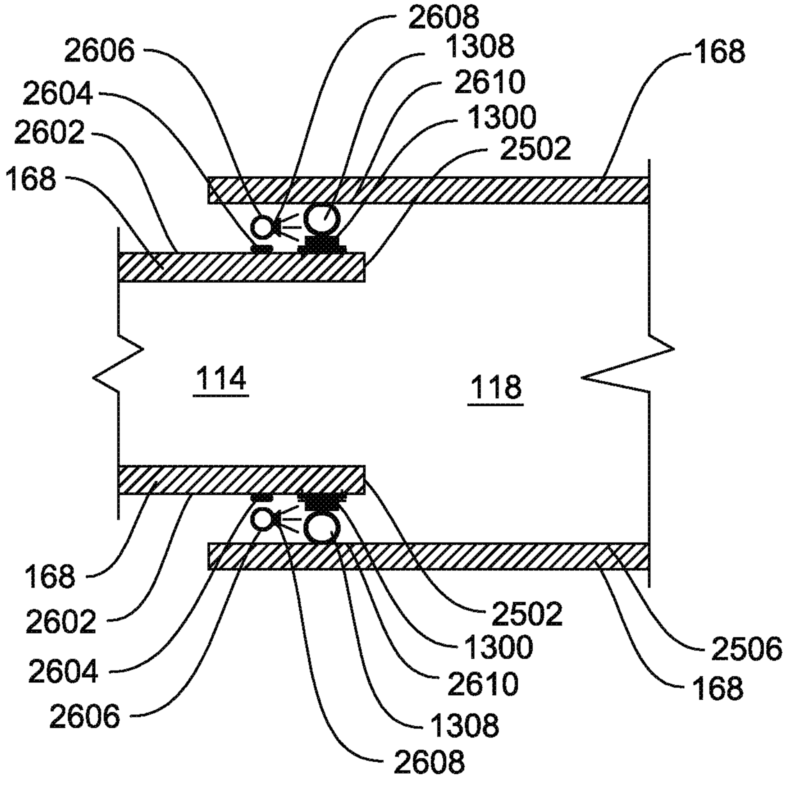
FIG. 26A is a partial top view at a joint taken at arrowed line A-A.

Now referring to FIG. 26A, a downward look section taken at line A-A in FIG. 25, an inflatable seal assembly 1300 is shown between tunnel sections 114 and 118 in an inflated state. When inflated, inflatable bladder 1308 contiguously and substantially contacts the interior 2610 of wall 168 of overlapping telescoping tunnel 114 to form an air barrier.

Figure 27:
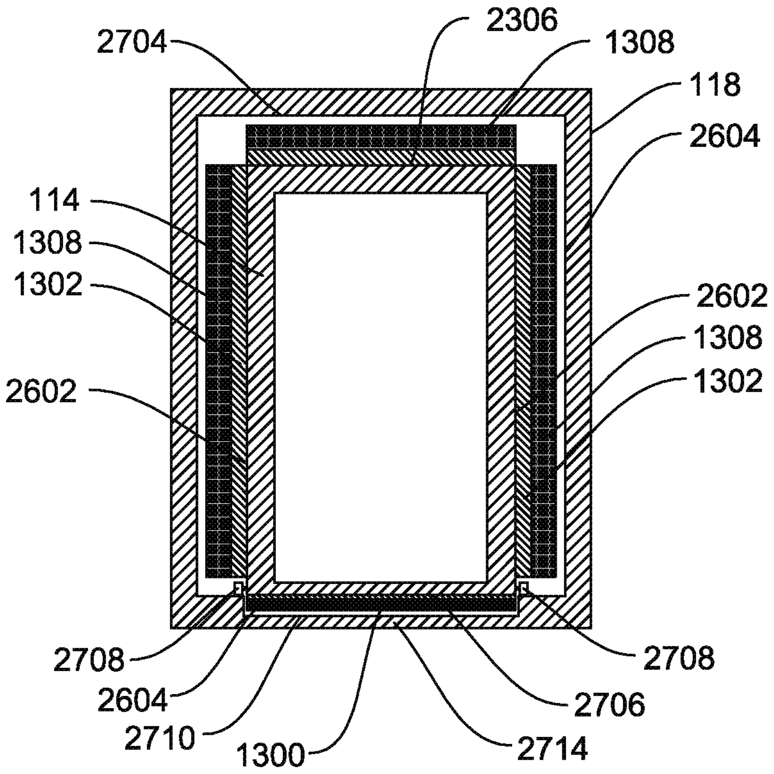
FIG. 27 is an interior elevation taken at arrowed line B-B in FIG. 25 at the joint of two telescoping tunnels illustrating an inflatable seal assembly.

Now turning to FIG. 27 a section at arrowed line B-B in FIG. 25 coinciding with arrowed line A-A in FIG. 26 inflatable seal assembly 1300 at may be comprised of a plurality of inflatable seal assemblies 1300 attached to the exterior sides 2602 and top 2506 of interior tunnel 114 to form a substantial and contiguous airtight seal between the exterior sides 2602 and top 2506 of overlapped telescoping tunnel 114 and interior sides 2604 and ceiling 2704 of overlapping telescoping tunnel 118 when inflatable bladder 1308 is inflated. An additional inflatable seal assembly 1300 may be attached under the floor 2706 of telescoping tunnel 114 between telescoping movement mechanisms 2708. Under floor 2706 inflatable bladder 1308 when inflated substantially and contiguously contacts the top 2710 of overlapping telescoping tunnel 118 between movement mechanisms 2708 thereby creating an air barrier between tunnel section 114 and tunnel section 118. When inflatable bladders 1308 are deflated the inflatable seal assemblies 1300 remain clear of overlapping telescoping tunnel 118 sides 2604, ceiling 2704, and floor 2714. Inflatable seal assemblies 1300 shown in the juncture region between overlapping tunnel sections 114, 118 may be subdivided into a plurality of inflatable seal assemblies 1300 to accommodate structural elements, geometry, movement or connection members, and/or to create better sealing properties. The juncture region between overlapped telescoping tunnel 112 and overlapping telescoping tunnel 114 are similar in location, fastening, and operation. The juncture region between telescoping tunnels 114 and 118 was selected for illustration and not meant to limit the scope of the disclosure which is to provide air barriers between the telescoping tunnel sections 112, 114, 118 of a passenger boarding bridge.

The inflatable seal assemblies 1300, sprinkler heads 2606, and thermocouples 2604 may be attached to the interior of an overlapping tunnel provided the elements are located at the maximum extension of the interior tunnel. However, the disadvantage in this arrangement is that unnecessary volume must be pressurized and will have more surface area with the potential for air leakage.

Figure 27A:
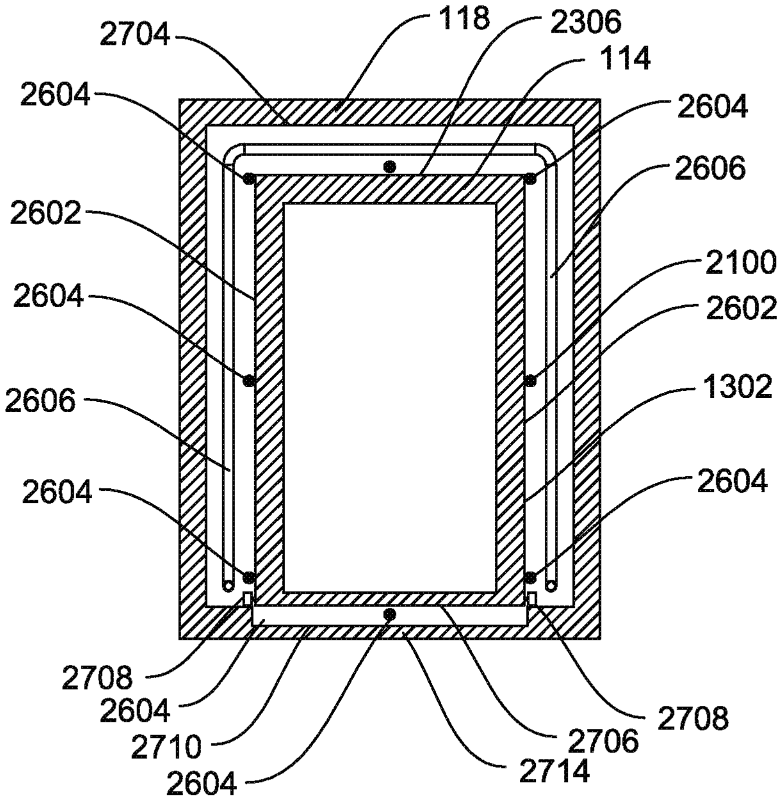
FIG. 27A is an interior elevation taken at arrowed line C-C in FIG. 25 at the joint of two telescoping tunnels illustrating thermocouples and dry sprinkler piping.

In FIG. 27A taken at arrowed line C-C in FIG. 26 thermocouples 2604 and dry sprinkler pipe 2606 are attached to the exterior 2602 of overlapped tunnel 112. Deluge nozzle 2608 is directed at inflatable seal assembly 1300.

Figure 28:
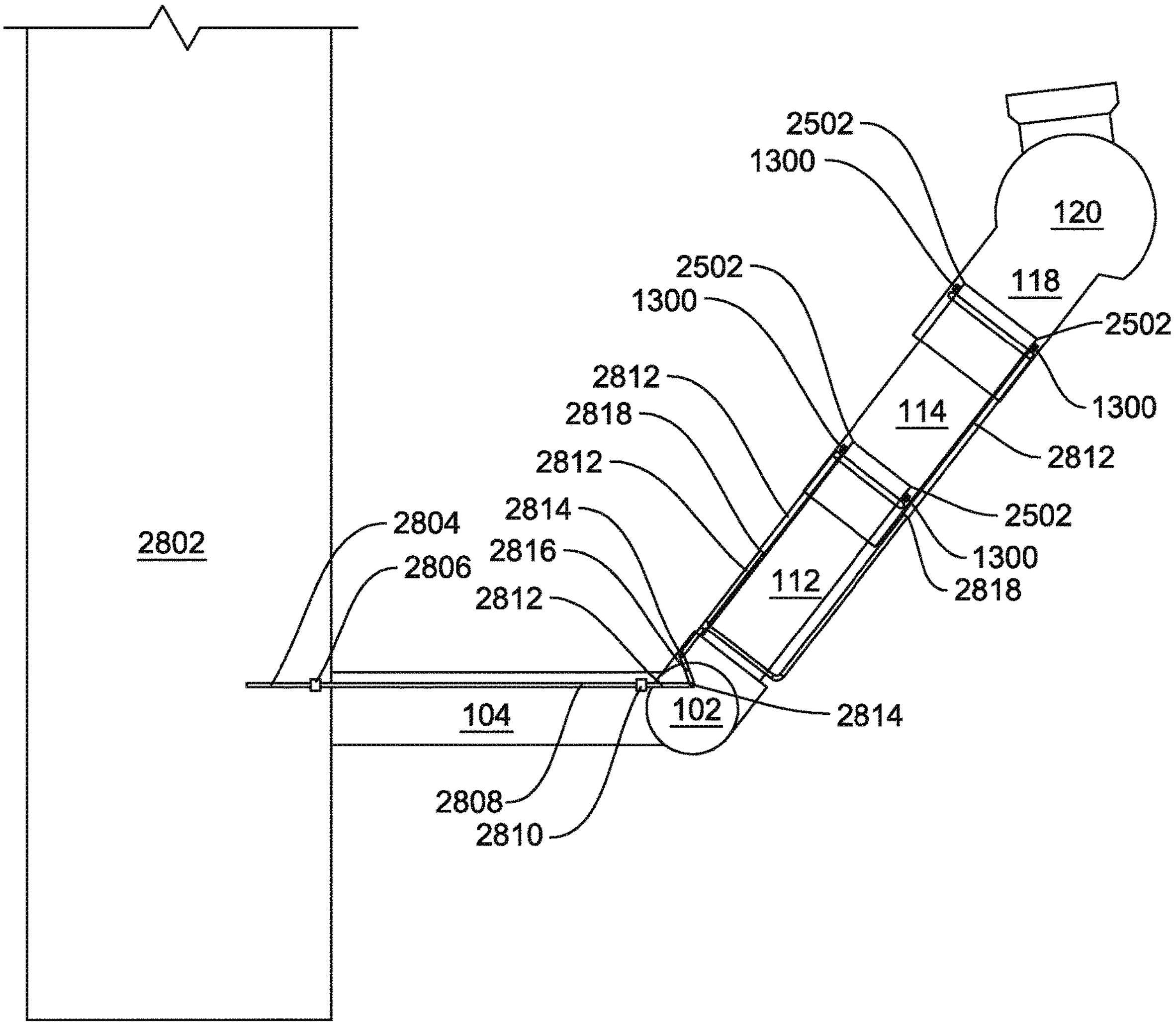
FIG. 28 is a top view of a concourse building, passenger boarding bridge, and fire sprinkler piping.

In FIG. 28 a sprinkler piping arrangement is illustrated to serve deluge sprinkler heads from concourse building 2802. Sprinkler piping 2804 with untreated, non-freeze protected water connects to concourse sprinkler piping (not shown). Motorized valve 2806 is normally closed and separates glycol sprinkler piping 2808 from non-freeze protected sprinkler piping 2804. Motorized valve 2810 is normally closed and separates glycol sprinkler piping 2808 from dry sprinkler piping 2812. Dry sprinkler piping 2812 articulates with passenger boarding bridge rotation at rotunda 102 by rotating joints 2814 and slip joint 2816. Dry sprinkler piping 2812 then extends and branches along tunnels 112 and 114 by means of telescoping slip joints 2818 to deluge sprinkler heads 2608. In the event of a ramp or other fire, flame temperatures may exceed 2,000° F. with corresponding radiant heat where inflatable bladder 1308 elastomeric operating temperatures may be no higher than 400° F. If temperatures near the inflatable seals 1308 exceed a threshold temperature of 300° F. thermocouples 2604 actuate motorized valves 2806 and 2810 open and water is delivered to deluge sprinkler heads 2608 and discharges onto inflatable seal assembly 1300 to maintain inflatable bladder 1308 below failure temperature.

A typical dry pipe sprinkler system 2812 is pressurized with air and serves fire sprinklers 2608 with fusible links. Given the requirement of dry sprinkler piping 2812 slip joints 2816, 2818 and rotating joints 2814 it is impractical maintain a pressurized dry sprinkler piping system across a plurality of passenger boarding bridges 100 with attendant unintended releases, maintenance and repair costs, and passenger boarding bridge 100 downtime. Therefore, the thermocouple 2604 activated system is disclosed. Controls and sequence of operation for a thermocouple 2604 activated dry pipe sprinkler system are described in further detail below.

Figure 29:
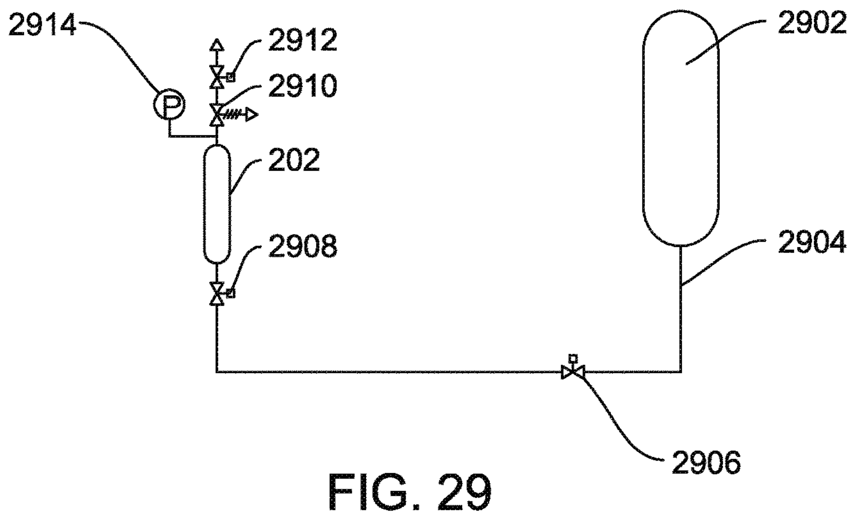
FIG. 29 illustrates schematic of a compressed air piping system with one inflatable seal and appurtenances.

FIG. 29 illustrates a schematic for the operation of an inflatable seal 202 as an example. Inflatable seal 202 may be inflated with a compressed gas, such as air, sufficient to increase internal pressure to expand seal 202 to fill the void where installed. Air compressor systems are well known and so a compressed air source is shown as a tank 2902 which supplies air at a minimum pressure throughout the system. Compressed air piping 2904 extends from the tank through a motorized isolation valve 2906, which may be optional on a single bladder system and a motorized air inlet valve 2908. A pressure relief valve 2910 with preset maximum pressure may be installed to prevent over pressurization which may cause damage to the bladder 202, passenger boarding bridge 100, 1800, 2500 components, or aircraft 124. A motorized air relief valve 2912 to atmosphere is used to close the compressed air system for inflation or open the system for deflation. A pressure transducer 2914 may be installed to monitor the pressure of the bladder 202. To inflate bladder seal 202 motorized valve 2912 closes, motorized isolation valve 2906 opens, and air inlet valve 2908 opens. Bladder 202 then inflates to a preset pressure thereby expanding to contact aircraft fuselage 128 as previously disclosed. To deflate bladder 202 air inlet valve 2908 closes and air relief valve 2912 opens thereby allowing air to discharge from bladder 202 to atmosphere.

Figure 30:
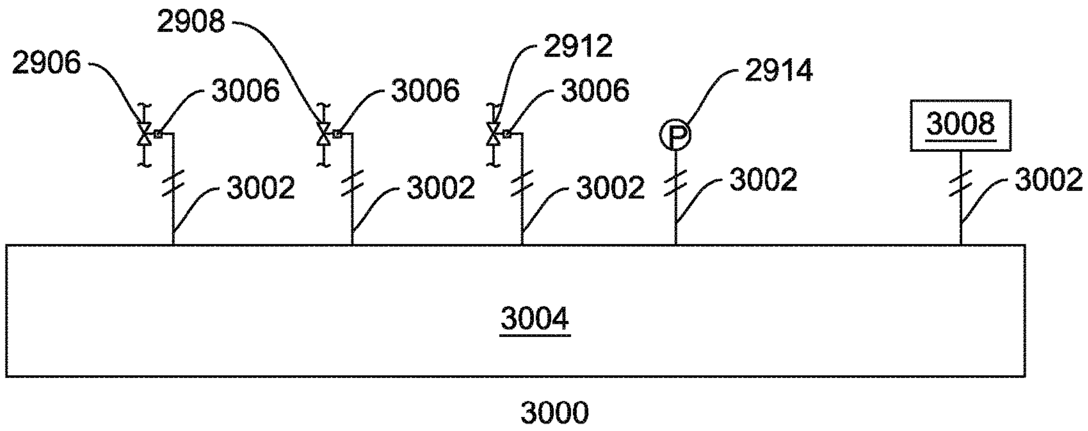
FIG. 30 illustrates a control diagram for a compressed air system.
Figure 30A:
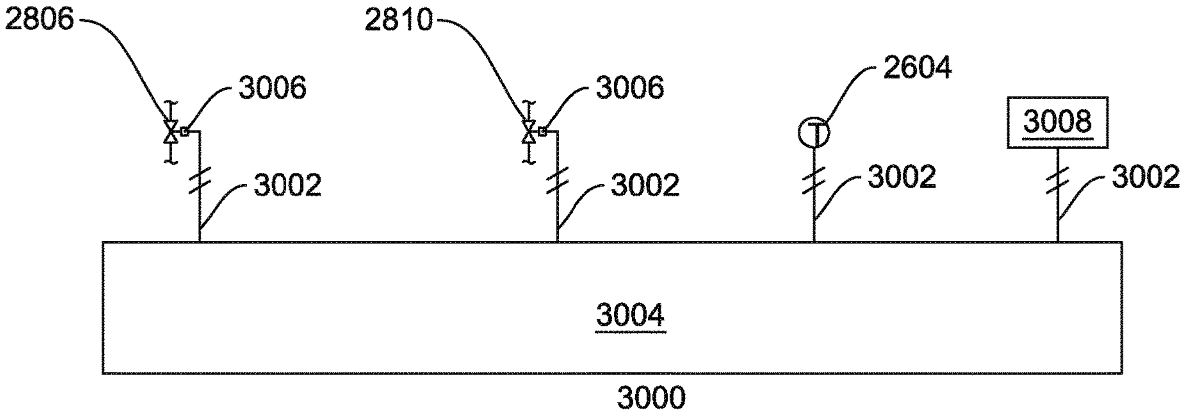
FIG. 30A illustrates a control diagram for a dry sprinkler system.

FIG. 30 illustrates a control diagram 3000 for a typical inflatable bladder 202. Control wires 3002 extend from controller 3004 outputs to valve actuators 3006 to control motorized valves 2906, 2908, and 2912. Actuators 3006 may be analog control for which controls wires 3002 are two strand, as illustrated, and controller 3004 sends a voltage signal to actuators 3006 to command motorized valves 2906, 2908, 2912 open or closed. Pressure transducer 2914 may also be analog for which it's control wires 3002 are two strand and controller 3004 receives an analog voltage input. Controller 3004 receives a preferably automatic signal from a prior art passenger boarding bridge controller 3008 to inflate or deflate the inflatable bladder seal 202. One output and input of each type are shown and described as typical. Where multiple inputs and outputs of each type are required it is understood that the controller connections duplicated and not all inputs and outputs are not shown for brevity. Controller 3004 logic may be of analog, digital or mixed analog/digital design. The control diagram 3000 is provided as an example of a control system and is not meant limit alternate control means or embellishments which may be added such as digital actuators 3006 and valve 2906, 2908, 2912 position (not shown). Control systems for valve actuation and pressure inputs are well known to those skilled in the art of controls FIG. 30A illustrates thermocouples 2604 connected as inputs to controller 3004 by control wire 3002. Sprinkler valves 2806, 2810 are actuated by controller 3004 through control wires 3002 to motorized actuators 3006 upon receipt of high temperature from thermocouples 2604. High temperature may be determined from a single thermocouple 2604, or through algorithmic statistic logic which may comprise fuzzy logic where multiple thermocouple 2604 values are compared to empirical operating temperatures to determine an event thereby reducing the potential for false actuations which reduce the service time of passenger boarding bridges 100 and increase operational costs. One output and input of each type are shown and described as typical. Where multiple inputs and outputs of each type are required, it is understood that the controller connections duplicated and not all inputs and outputs are not shown for brevity.

Figure 31:
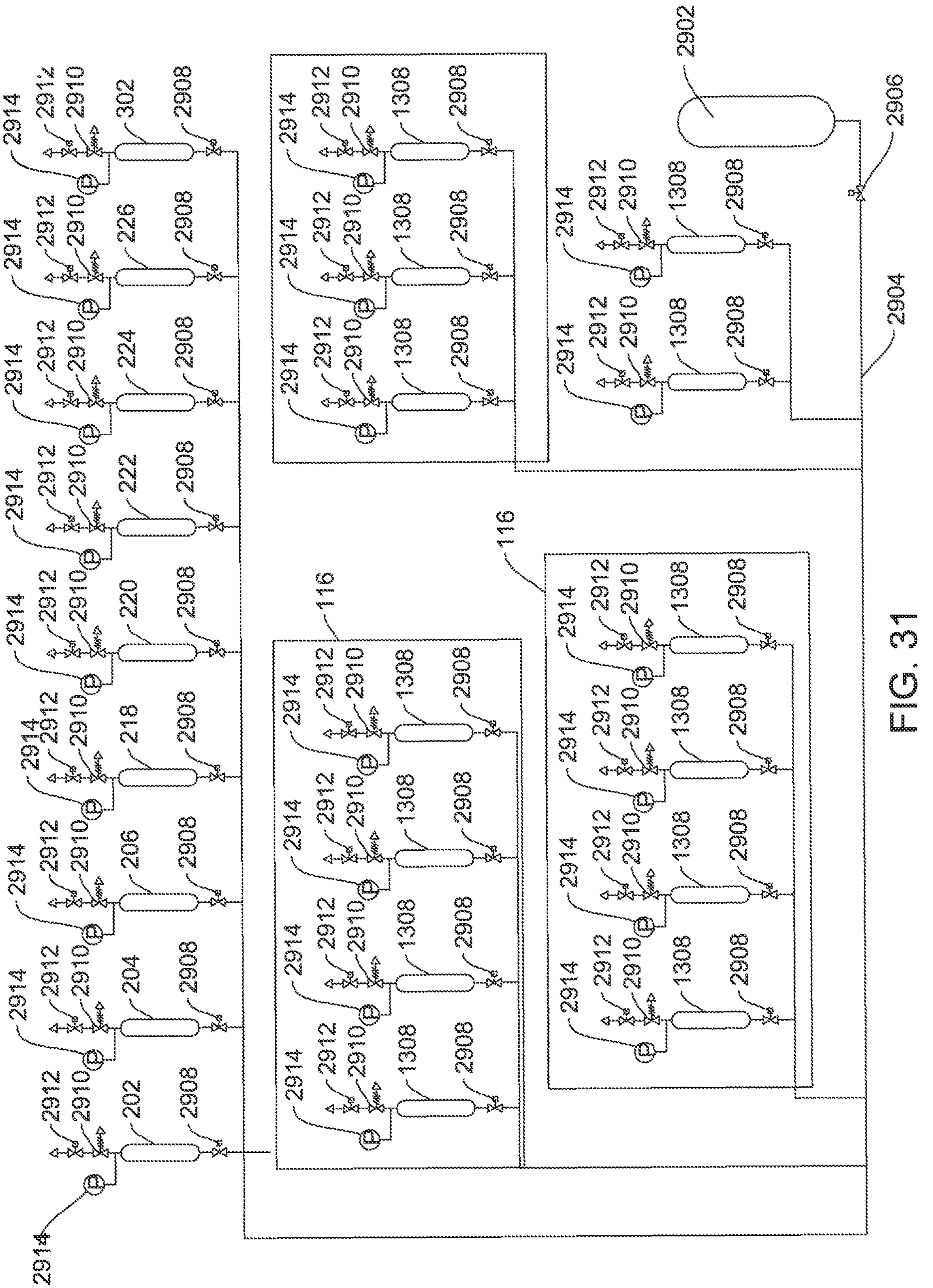
FIG. 31 illustrates a compressed air system schematic for a passenger boarding bridge incorporating disclosed inflatable seals.

FIG. 31 illustrates a compressed air piping schematic for a whole passenger boarding bridge 100, 1800, 2500 with inflatable bladders 202, 204, 206, 218, 220, 222, 224, 226, and 302.

The controls depicted in FIG. 30 supporting FIG. 31 is not shown enumerated as the control schematic 3000 is repeated the same number of times as the bladders shown in FIG. 31. In a compressed air system 700 with a compressed air source 704 located in an airport building hoses 708 may route to individual telescoping tunnels 112, 114, 118 and cab 120 by means of utility arms 138 and then routing through or along tunnels 112, 114, 118 to inflatable bladders 202, 204, 206, 612 as required. Myriad piping and valving schemes may be used to connect and control the compressed air source system 700 and may include a plurality of combinations of headers, series, and parallel configurations. The configuration shown is not meant to convey a particular sequence of how inflatable bladder seals are connected to the compressed air system, but to illustrate how they may be connected. Pressure may be measured in the inflated state and air inlet valve automatically controlled to maintain pressure in the inflatable bladders. The remainder of a compressed air system is well known to those skilled in the art of compressed air systems.

Figure 32:
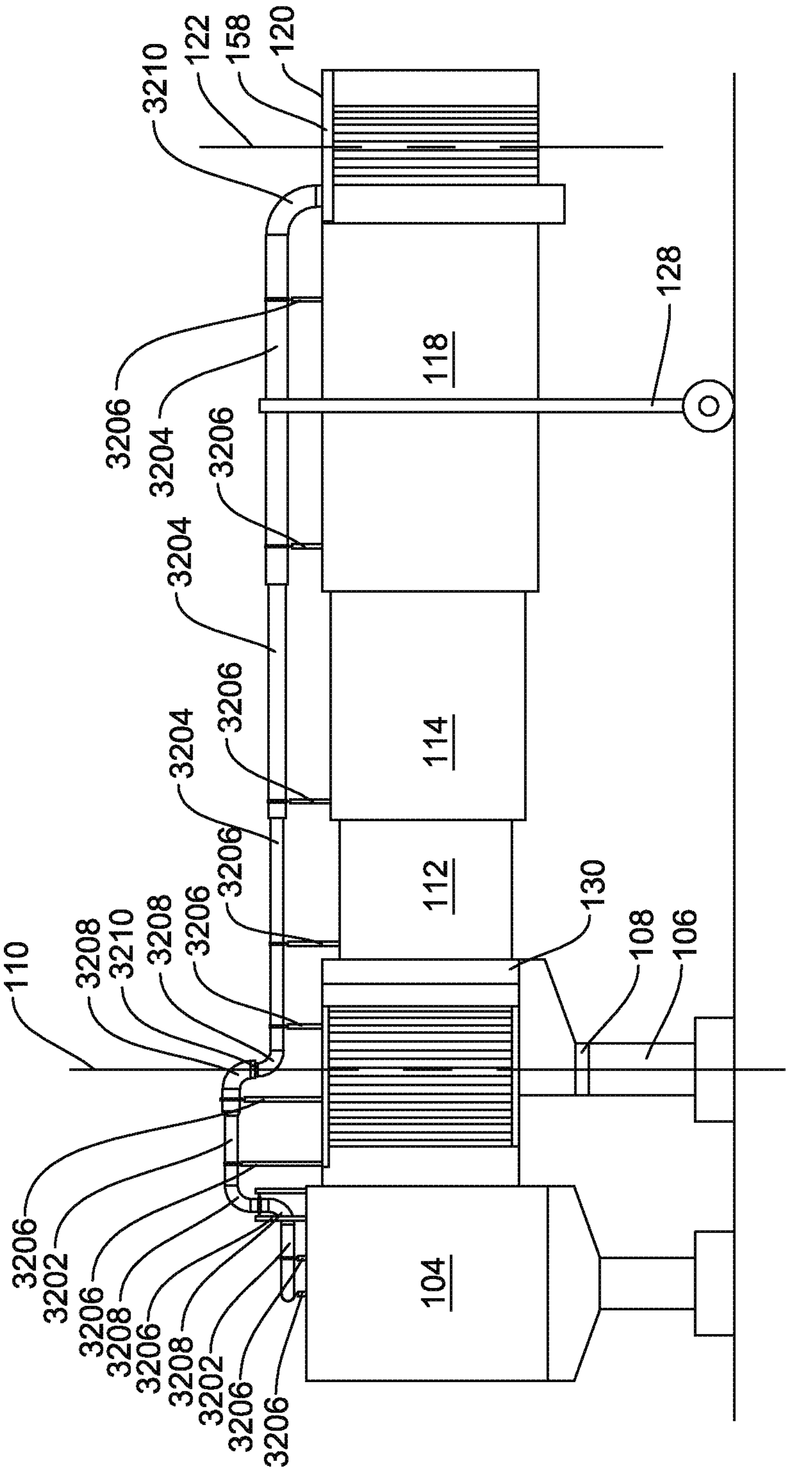
FIG. 32 illustrates a side view of a passenger boarding bridge with a telescoping air duct.

Sealing an improved passenger boarding bridge 100 substantially airtight reduces air infiltration and exfiltration at a time of maximum occupant loading when boarding or deplaning an aircraft 124 therefore FIG. 32 illustrates a ventilation duct 3202 extending from an air handling source (not shown) preferably from a concourse or terminal (not shown). Ventilation duct 3202 is comprised of a plurality of telescoping air duct segments 3204 along and corresponding with the number of telescoping tunnels 112, 114, and 118 and terminates in the cab 120 to distribute breathing air to the occupied space. Air duct segments 3202, 3204 are supported by supports 3206 which are positioned to accommodate the telescoping movement of telescoping air duct segments 3204. On top of rotunda roof 154 air duct 3202 may incorporate elbows 3208 to provide a rotatable vertical duct joint 3210 substantially centered on centerline 110. Vertical duct joint 3210 comprises a duct of larger diameter which fits over a duct of smaller diameter and may have an internal lining (not shown) such as Teflon to reduce friction, material wear and otherwise improve rotational movement. The location at the centerline 110 allows the duct 3202 to pivot at axis 110. Telescoping duct segments 3204 may be constructed of PVC or CPVC to allow sliding and may incorporate an internal "O" ring to provide a substantially airtight seal. Telescoping duct segments 3204 may also be insulated to reduce energy losses of conditioned air to cab 120.

Figure 33:
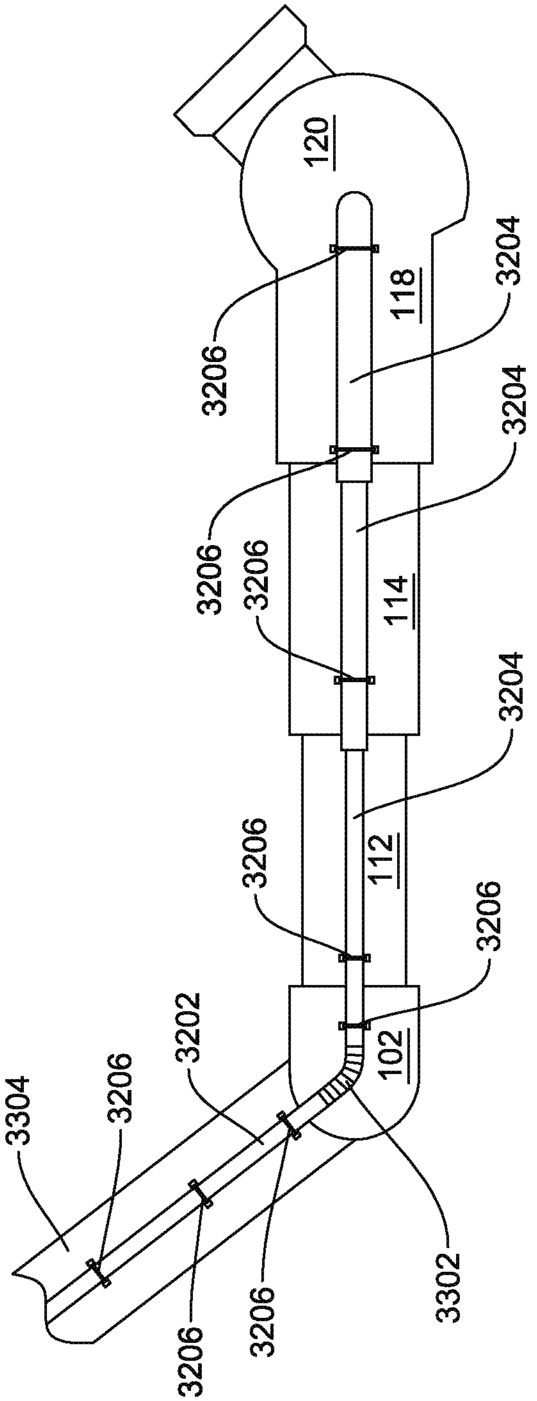
FIG. 33 illustrates a top view of a passenger boarding bridge with a telescoping duct with an alternate embodiment.

FIG. 33 illustrates a top view of the telescoping air duct 3202, 3204 on top of an improved passenger boarding bridge 100 illustrating an alternate embodiment at the rotunda 102 of a flexible duct 3302 which will also facilitate passenger boarding bridge rotation about axis 110. Prior art fixed walkway 3304 connecting the passenger boarding bridge 100 to an airport terminal or concourse is also shown.

Figure 34:
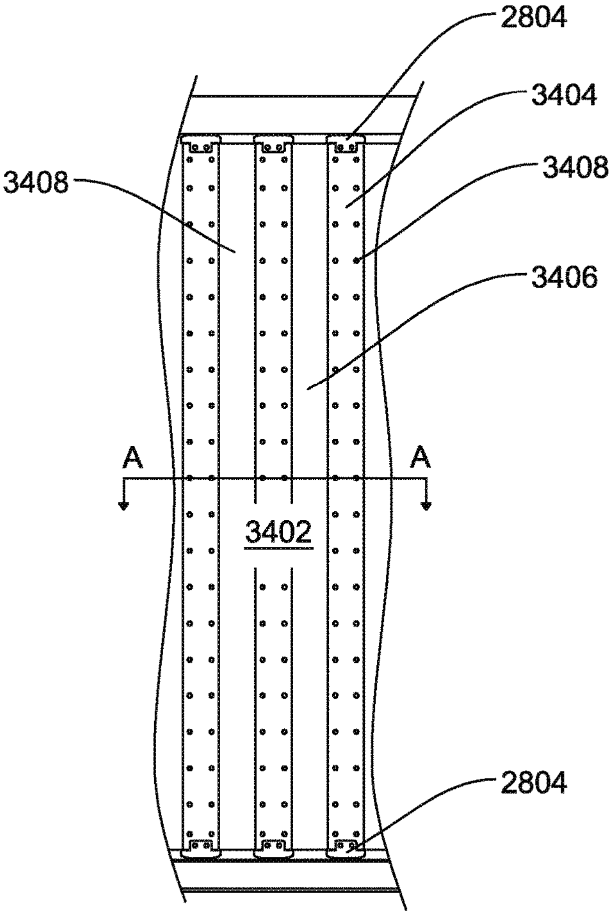
FIG. 34 illustrates a partial section of an improved arcuate curtain.

FIG. 34 illustrates a partial elevation of arcuate curtain 152 as improved arcuate curtain 3402. Stiffening strips 3404 which provide vertical support are fastened to elastomeric strips 3406 with fasteners 3408. Prior art guides 2804 are fastened at the top and bottom of stiffening strips 3404 to interface with rotunda floor 156 and rotunda roof 154. Stiffening strips 3404 may be constructed of aluminum, steel, reinforced plastic, or other suitable material.

Figure 35:
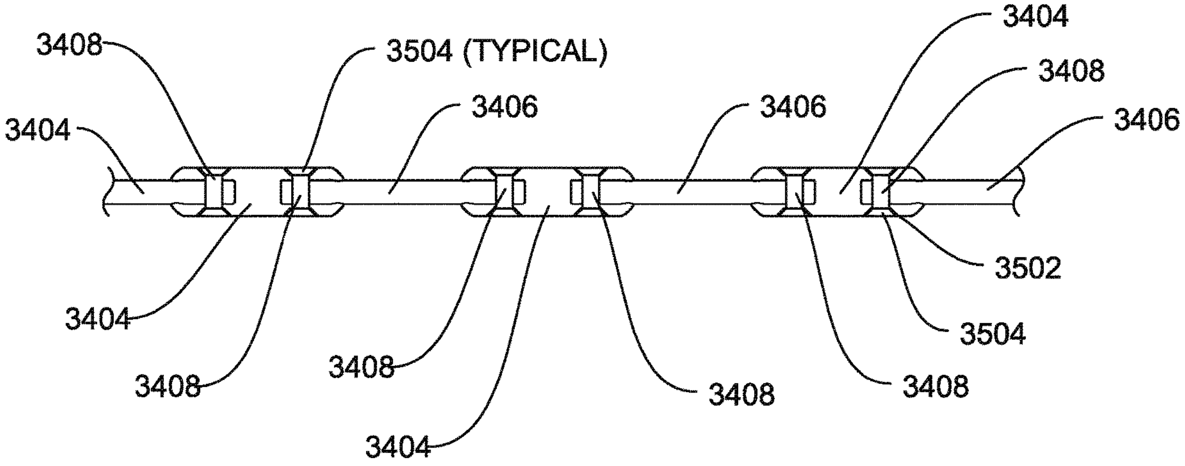
FIG. 35 is a section looking downward taken at arrowed line A-A in FIG. 34 illustrating the elements of an improved arcuate curtain.

FIG. 35 is a partial section taken at line A-A in FIG. 34 illustrating a curtain assembly with discrete elastomeric strips 3406 terminating within metal strips 3404. Metal strips 3404 may be shaped to indent elastomeric strips 3406 for improved airtight seal. Fasteners 3408 may be gasketed 3502 to seat between countersunk heads 3504 and metal strips 3404.

Figure 36:
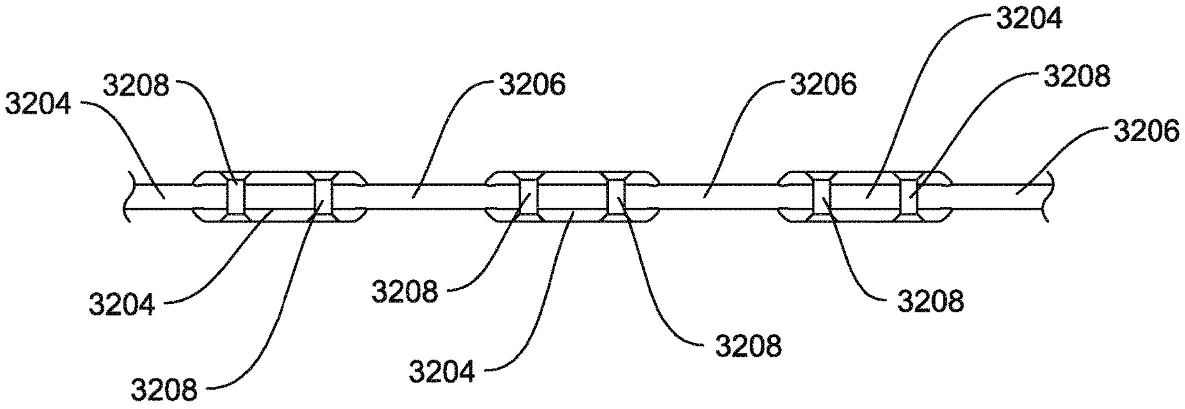
FIG. 36 is a section looking downward taken at arrowed line A-A in FIG. 34 illustrating the elements of an alternate embodiment of an improved arcuate curtain.

FIG. 36 is similarly a partial section taken at line A-A in FIG. 34 illustrating a curtain assembly with a continuous elastomeric strip 3206 with similar fastening as illustrated and described for FIG. 35.

Other passenger boarding bridge construction, such as joining of exterior sheet metal or metal structures may not be well sealed. To improve the passenger boarding bridge envelope to a substantially airtight condition these joints must be sealed by means such as caulking or gasketing these assemblies or other means known to those skilled in the art of fixed enclosure sealing.

Operation

A passenger boarding bridge 100 is docked with aircraft 124 typically after positioning the cab floor edge 214 1" to 3" from aircraft fuselage 128 with cab floor 144 at approximately the same height as aircraft floor 146 and deploying awning 126. After passenger boarding bridge 100 is fixed in docking position a signal is sent to controller 3004 which actuates motorized valves 2906, 2908, 2912 as previously described thereby inflatable bladders 202, 204, 206, 208, 210, 212, and 1308 are inflated.

When aircraft 124 is ready to depart a signal is sent to controller 3004 which actuates motorized valves 2906, 2908, 2912 as previously described thereby inflatable bladders 202, 204, 206, 208, 210, 212, and 1308 are deflated prior to retracting awning 126 and moving passenger boarding bridge 100 away from aircraft 124.

When the gate door (not shown) is open between the concourse and the improved passenger boarding bridge 100 the exterior aircraft 124 service doors (not shown) between the exterior and passenger compartment must be closed to provide a substantially airtight envelope.

The preceding description and drawings have been presented only to illustrate and describe disclosed embodiments. It is not intended to be exhaustive or to limit the embodiment to any precise form disclosed. Many modifications and variations are possible considering the above teaching. The embodiments may be comprised of a selection among many types of materials selected by those skilled in the respective arts.

Reference in this specification to "one embodiment" or "an embodiment" or "some embodiments" means that a particular feature, structure, or characteristic described in connection with the embodiment is included in at least one embodiment of the disclosure. The appearances of the phrase "in one embodiment", or similar phrases, in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

The invention claimed is:

1. A passenger boarding bridge for extending an environmental envelope of an airport concourse to a parked aircraft, comprising:

- a rotunda section connectable to a doored exit of the airport concourse, said rotunda section comprising:
  - a horizontal rotunda air barrier situated below the rotunda roof, said horizontal air barrier including at least:
    - a first horizontal rotunda member adapted to be fixed in position when the rotunda section is connected to the doored exit, and
    - a second horizontal rotunda member that is rotatable relative to said first horizontal rotunda member about a rotunda section vertical axis;
- a cab section adapted to dock with the parked aircraft, said cab section
  - comprising: a horizontal cab air barrier including at least:
    - a first horizontal cab member adapted to be fixed in position when the cab section is docked with the parked aircraft, and
    - a second horizontal cab member that is rotatable relative to said first horizontal cab member about a cab section rotation axis;
  - a cab awning including an awning pad with at least one awning expandable bladder seal attached thereto; and
  - a cab floor having an underside with an associated cab floor seal adapted to contact a fuselage of the parked aircraft; and
- at least one tunnel section located between the rotunda section and the movable cab, there being a first surrounding and expandable air barrier seal at a first juncture region between said rotunda section and said at least one tunnel section, and a second surrounding and expandable air barrier seal at a second juncture region between said at least one tunnel section and said cab section.

2. The passenger boarding bridge of claim 1 wherein said at least one tunnel section includes a plurality of telescoping tunnels.

3. The passenger boarding bridge of claim 2 further comprising at least one inflatable seal assembly located at each juncture of said telescoping tunnels.

4. The passenger boarding bridge of claim 3 further comprising a ventilation duct connectable to an air handling source and extending along substantially an entire length of said passenger boarding bridge, said ventilation duct comprising a selected number of ventilation duct segments corresponding to at least the plurality of telescoping tunnels said ventilation duct terminating in the cab section thereby providing breathing air to occupants.

5. The passenger boarding bridge of claim 1 wherein said rotunda section further comprises a rotunda roof, and wherein said first horizontal rotunda member extends from an end wall of the doored exit toward said at least one tunnel section, and said second horizontal rotunda member extends proximate to the at least one tunnel section toward said end wall.

6. The passenger boarding bridge of claim 1 wherein said rotunda member further comprises a rotunda roof, and wherein said first horizontal rotunda member extends proximate to said at least one tunnel section toward an end wall of said doored exit, and said second horizontal rotunda member extends from said end wall toward said at least one tunnel section.

7. The passenger boarding bridge of claim 1 wherein said rotunda section further comprises a rotunda exterior wall, fixed rotunda walls, rotational rotunda walls and arcuate curtains, and wherein:

- said first horizontal member extends from said doored exit toward said at least one tunnel section and is bounded by an end wall of said doored exit, said fixed rotunda walls, said arcuate curtains and a radial arc that is defined at an intersection of said at least one tunnel section with said rotunda roof; and
- said second horizontal member is rotatable about said rotunda vertical axis and is bounded by said rotunda exterior wall, said rotational rotunda walls and said radial arc.

8. The passenger boarding bridge of claim 1 wherein said horizontal rotunda air barrier is interposed between a roof of said rotunda and an architectural ceiling of said rotunda, and including an insulation layer in an interstitial space between said horizontal rotunda air barrier and said architectural ceiling.

9. The passenger boarding bridge of claim 8 wherein said horizontal rotunda air barrier serves as an architectural ceiling of said rotunda section and includes an insulation layer.

10. The passenger boarding bridge of claim 1 further comprising calipers for sealing said first horizontal rotunda member to said second horizontal rotunda member.

11. The passenger boarding bridge of claim 10 wherein each of said calipers includes a groove for enhancing an air barrier seal between said first horizontal rotunda member and said second horizontal rotunda member.

12. The passenger boarding bridge of claim 1 wherein said first horizontal rotunda member and said second horizontal member abut one another.

13. The passenger boarding bridge of claim 1 wherein said first horizontal rotunda member and said second horizontal rotunda member overlap one another.

14. The passenger boarding bridge of claim 1 further comprising at least one vertical rotunda air barrier fastened to said horizontal rotunda air barrier.

15. The passenger boarding bridge of claim 1 wherein said first surrounding and expandable air barrier comprises at least one inflatable seal assembly.

16. The passenger boarding bridge of claim 1 wherein said second surrounding and expandable air barrier comprises at least one inflatable seal assembly.

17. The passenger boarding bridge of claim 1 further comprising a ventilation duct connectable to an air handling source and extending along substantially an entire length of said passenger boarding bridge and terminating at said cab section.

18. The passenger boarding bridge of claim 1 wherein said at least one awning inflatable bladder seal includes a vertical bladder seal and a horizontal bladder seal.

19. The passenger boarding bridge of claim 1 wherein said cab floor seal is an inflatable bladder seal.

20. The passenger boarding bridge of claim 1 wherein said cab floor seal is movable between a contracted position having a deflated state wherein said cab floor seal is disengaged from said fuselage, and a deployed position having an inflated state wherein said cab floor seal contacts said fuselage.

21. The passenger boarding bridge of claim 1 wherein said cab floor seal comprises a deformable bumper.

22. A passenger boarding bridge for extending an environmental envelope of an airport concourse to a parked aircraft, comprising:

a proximal section connectable to a doored exit of the airport concourse, said proximal section comprising a proximal section air barrier including at least a first proximal section air barrier member that is fixed in position when the proximal section is connected to the door exit, and a second proximal section air barrier member that is rotatable relative to said first proximal section air barrier member about a proximal section vertical axis;

a distal section adapted to dock with the parked aircraft, said distal section comprising a distal section air barrier including at least a first distal section cab member that is fixed in position when the distal section is docked with the parked aircraft, and a second distal section air barrier member that is rotatable relative to said distal section air barrier member about a distal section rotational axis; and at least one tunnel section interposed between the proximal section and the distal section;

a plurality of distal section seals associated with said distal section and adapted to contact said parked aircraft when the distal section is docked with the parked aircraft;

a first plurality of seals for sealing a juncture of said proximal section and said tunnel section; and a second plurality of seals for sealing a juncture of said distal section and said tunnel section.

* * * * *